United States Patent
Dams

(10) Patent No.: US 8,629,089 B2
(45) Date of Patent: *Jan. 14, 2014

(54) METHOD OF CONTACTING HYDROCARBON-BEARING FORMATIONS WITH FLUORINATED ETHER COMPOSITIONS

(75) Inventor: Rudolf J. Dams, Antwerp (BE)

(73) Assignee: 3M Innovative Properties Company, St. Paul, MN (US)

( * ) Notice: Subject to any disclaimer, the term of this patent is extended or adjusted under 35 U.S.C. 154(b) by 219 days.

This patent is subject to a terminal disclaimer.

(21) Appl. No.: 13/140,242

(22) PCT Filed: Dec. 17, 2009

(86) PCT No.: PCT/US2009/068393
§ 371 (c)(1),
(2), (4) Date: Jun. 16, 2011

(87) PCT Pub. No.: WO2010/080473
PCT Pub. Date: Jul. 15, 2010

(65) Prior Publication Data
US 2011/0247822 A1    Oct. 13, 2011

Related U.S. Application Data

(60) Provisional application No. 61/138,766, filed on Dec. 18, 2008.

(51) Int. Cl.
*C09K 8/60* (2006.01)
(52) U.S. Cl.
USPC ........ 507/205; 166/305.1; 526/246; 526/247; 526/248

(58) Field of Classification Search
USPC ......... 166/305.1; 507/205; 526/246, 247, 248
See application file for complete search history.

(56) References Cited

U.S. PATENT DOCUMENTS

| | | |
|---|---|---|
| 2,367,010 A | 1/1945 | Davis |
| 2,713,593 A | 7/1955 | Brice |
| 2,803,615 A | 8/1957 | Ahlbrecht |
| 2,826,564 A | 3/1958 | Bovey |
| 3,250,808 A | 5/1966 | Moore, Jr. |
| 3,271,341 A | 9/1966 | Garrison |
| 3,274,244 A | 9/1966 | Mackenzie |

(Continued)

FOREIGN PATENT DOCUMENTS

| | | |
|---|---|---|
| CA | 761007 | 6/1967 |
| CA | 2009732 | 8/1990 |

(Continued)

OTHER PUBLICATIONS

Adibhatla, "Effect of Surfactants on Wettability of Near-wellbore Regions of Gas Reservoirs", Journal of Petroleum Science and Engineering, 2006, vol. 52, pp. 227-236. (XP002519991).

(Continued)

*Primary Examiner* — Nicole M Buie-Hatcher

(57) ABSTRACT

Method comprising contacting a hydrocarbon-bearing formation with a composition comprising solvent and a fluoropolyether compound, wherein the fluoropolyether compound comprises at least one first divalent unit represented by formula: Each Rf is independently selected from the group consisting of $Rf^a$—$(O)_t$—CHL'-$(CF_2)_n$—; $[Rf^a$—$(O)_t$—C(L)H—$CF_2)$—$O]_m$—W—; $Rf^b$—O—$(CF_2)$p-; $F(C_kF_{2k})$—(O—$C_kF_{2K}$)$_p$—O—$CF_2$—; and $CF_3$—O—$(CF_2)_3$—OCF$(CF_3)$—$CF_2)_z$—O-$L^1$-. Treated hydrocarbon-bearing formations are also disclosed.

20 Claims, 3 Drawing Sheets

(56) References Cited

U.S. PATENT DOCUMENTS

| | | |
|---|---|---|
| 3,278,352 A | 10/1966 | Erickson |
| 3,306,855 A | 2/1967 | Borecki |
| 3,311,167 A | 3/1967 | O'Brien |
| 3,391,099 A | 7/1968 | Puderson |
| 3,394,758 A | 7/1968 | Terry |
| 3,451,908 A | 6/1969 | Sianesi |
| 3,469,630 A * | 9/1969 | Hurd et al. .............. 166/252.1 |
| 3,492,374 A | 1/1970 | Le Bleu |
| 3,536,310 A | 10/1970 | Bartlett |
| 3,553,179 A | 1/1971 | Bartlett |
| 3,555,089 A | 1/1971 | Bartlett |
| 3,555,100 A | 1/1971 | Garth |
| 3,589,906 A | 6/1971 | McDowell |
| 3,621,059 A | 11/1971 | Bartlett |
| 3,644,492 A | 2/1972 | Bartlett |
| 3,646,085 A | 2/1972 | Bartlett |
| 3,653,442 A | 4/1972 | Ross |
| 3,721,696 A | 3/1973 | Sianesi |
| 3,787,351 A | 1/1974 | Olson |
| 3,798,265 A | 3/1974 | Bartlett |
| 3,810,874 A | 5/1974 | Mitsch |
| 3,814,741 A * | 6/1974 | Caporiccio .................. 526/246 |
| 3,839,425 A | 10/1974 | Bartlett |
| 3,902,557 A | 9/1975 | Shaughnessy |
| 3,927,072 A | 12/1975 | Fox |
| 3,944,527 A * | 3/1976 | McCown ................... 526/243 |
| 3,944,610 A | 3/1976 | Caporiccio |
| 4,018,689 A | 4/1977 | Thompson |
| 4,025,709 A | 5/1977 | Blaise |
| 4,085,137 A | 4/1978 | Mitsch |
| 4,089,804 A | 5/1978 | Falk |
| 4,200,154 A | 4/1980 | Tate |
| 4,292,402 A | 9/1981 | Pollet |
| 4,329,236 A | 5/1982 | Alford |
| 4,380,618 A | 4/1983 | Khan |
| 4,381,384 A | 4/1983 | Khan |
| 4,425,242 A * | 1/1984 | Penny et al. ................ 507/205 |
| 4,432,882 A | 2/1984 | Raynolds |
| 4,440,653 A | 4/1984 | Briscoe |
| 4,460,791 A | 7/1984 | Cooke |
| 4,544,458 A | 10/1985 | Grot |
| 4,557,837 A | 12/1985 | Clark, III |
| 4,565,639 A | 1/1986 | Penny |
| 4,588,796 A | 5/1986 | Wheland |
| 4,594,200 A | 6/1986 | Penny |
| 4,609,477 A | 9/1986 | Crema |
| 4,621,116 A | 11/1986 | Morgan |
| 4,624,795 A * | 11/1986 | Dawson et al. ............. 507/205 |
| 4,702,849 A | 10/1987 | Penny |
| 4,753,740 A | 6/1988 | Marlett |
| 4,766,190 A | 8/1988 | Morita |
| 4,767,545 A | 8/1988 | Karydas |
| 4,789,717 A | 12/1988 | Giannetti |
| 4,817,715 A | 4/1989 | Peru |
| 4,823,873 A | 4/1989 | Karydas |
| 4,832,879 A | 5/1989 | Hamprecht |
| 4,859,754 A | 8/1989 | Maekawa |
| 4,861,845 A | 8/1989 | Slocum |
| 4,864,006 A | 9/1989 | Giannetti |
| 4,921,619 A | 5/1990 | Karydas |
| 4,923,009 A | 5/1990 | Watkins |
| 4,987,254 A | 1/1991 | Schwertfeger |
| 4,993,448 A | 2/1991 | Karydas |
| 4,997,580 A | 3/1991 | Karydas |
| 5,042,580 A | 8/1991 | Cullick |
| 5,043,464 A | 8/1991 | Yamamoto |
| 5,092,405 A | 3/1992 | Prukop |
| 5,129,457 A | 7/1992 | Sydansk |
| 5,130,477 A | 7/1992 | Koike |
| 5,132,446 A | 7/1992 | Tohzuka |
| 5,153,322 A | 10/1992 | Flynn |
| 5,162,469 A | 11/1992 | Chen |
| 5,186,257 A | 2/1993 | Stahl |
| 5,247,993 A | 9/1993 | Sarem |
| 5,256,318 A | 10/1993 | Masutani |
| 5,270,378 A | 12/1993 | Johnson |
| 5,285,002 A | 2/1994 | Grootaert |
| 5,310,002 A | 5/1994 | Blauch |
| 5,350,497 A | 9/1994 | Hung |
| 5,358,052 A | 10/1994 | Gidley |
| 5,370,919 A | 12/1994 | Fieuws |
| 5,395,657 A | 3/1995 | Strepparola |
| 5,399,718 A | 3/1995 | Costello |
| 5,414,102 A | 5/1995 | Pohmer |
| 5,424,474 A | 6/1995 | Pohmer |
| 5,447,982 A | 9/1995 | Kamba |
| 5,453,539 A | 9/1995 | Kondo |
| 5,488,142 A | 1/1996 | Fall |
| 5,498,680 A | 3/1996 | Abusleme |
| 5,502,251 A | 3/1996 | Pohmer |
| 5,516,578 A | 5/1996 | Coppens |
| 5,532,310 A | 7/1996 | Grenfell |
| 5,536,425 A | 7/1996 | Kondo |
| 5,550,277 A | 8/1996 | Paciorek |
| 5,608,022 A | 3/1997 | Nakayama |
| 5,656,201 A | 8/1997 | Visca |
| 5,663,255 A | 9/1997 | Anolick |
| 5,688,884 A | 11/1997 | Baker |
| 5,710,345 A | 1/1998 | Navarrini |
| 5,763,552 A | 6/1998 | Feiring |
| 5,789,508 A | 8/1998 | Baker |
| 5,804,650 A | 9/1998 | Tsuda |
| 5,929,290 A | 7/1999 | Komiya |
| 5,955,556 A | 9/1999 | McCarthy |
| 5,959,026 A | 9/1999 | Abusleme |
| 5,965,659 A | 10/1999 | Kubo |
| 5,969,063 A | 10/1999 | Parker |
| 6,013,712 A | 1/2000 | Chittofrati |
| 6,013,795 A | 1/2000 | Manzara |
| 6,025,307 A | 2/2000 | Chittofrati |
| 6,037,429 A | 3/2000 | Linert |
| 6,103,843 A | 8/2000 | Abusleme |
| 6,126,849 A | 10/2000 | Yamana |
| 6,127,498 A | 10/2000 | Tonelli |
| 6,165,948 A | 12/2000 | Dewenter |
| 6,180,826 B1 | 1/2001 | Szonyi |
| 6,182,759 B1 | 2/2001 | Burger |
| 6,184,187 B1 | 2/2001 | Howell |
| 6,206,102 B1 | 3/2001 | Pusch |
| 6,207,777 B1 | 3/2001 | Shimada |
| 6,225,263 B1 | 5/2001 | Collins |
| 6,255,536 B1 | 7/2001 | Worm |
| 6,297,334 B1 | 10/2001 | Marchese |
| 6,395,848 B1 | 5/2002 | Morgan |
| 6,410,626 B1 | 6/2002 | Wada |
| 6,429,258 B1 | 8/2002 | Morgan |
| 6,452,038 B1 | 9/2002 | Rao |
| 6,479,605 B1 | 11/2002 | Franchina |
| 6,482,979 B1 | 11/2002 | Hintzer |
| 6,512,063 B2 | 1/2003 | Tang |
| 6,566,470 B2 | 5/2003 | Kantamneni |
| 6,576,703 B2 | 6/2003 | Kapeliouchko |
| 6,579,572 B2 | 6/2003 | Espin |
| 6,602,968 B1 | 8/2003 | Bekiarian |
| 6,610,788 B1 | 8/2003 | Takakura |
| 6,613,860 B1 | 9/2003 | Dams |
| 6,624,268 B1 | 9/2003 | Maekawa |
| 6,632,508 B1 | 10/2003 | Pellerite |
| 6,642,307 B1 | 11/2003 | Sogabe |
| 6,646,088 B2 | 11/2003 | Fan |
| 6,656,258 B2 | 12/2003 | Elsbernd |
| 6,660,693 B2 | 12/2003 | Miller |
| 6,660,798 B1 | 12/2003 | Marchese |
| 6,664,354 B2 | 12/2003 | Savu |
| 6,677,414 B2 | 1/2004 | Hintzer |
| 6,689,854 B2 * | 2/2004 | Fan et al. ..................... 526/243 |
| 6,693,152 B2 | 2/2004 | Kaspar |
| 6,703,520 B2 | 3/2004 | Hintzer |
| 6,716,534 B2 | 4/2004 | Moore |
| 6,729,409 B1 | 5/2004 | Gupta |
| 6,730,760 B2 | 5/2004 | Grootaert |
| 6,737,489 B2 | 5/2004 | Linert |
| 6,750,304 B2 | 6/2004 | Kaspar |
| 6,774,164 B2 | 8/2004 | Lyons |

(56) References Cited

U.S. PATENT DOCUMENTS

| | | |
|---|---|---|
| 6,815,040 B2 | 11/2004 | Pellerite |
| 6,822,059 B2 | 11/2004 | Buckanin |
| 6,833,418 B2 | 12/2004 | Tan |
| 6,872,324 B2 | 3/2005 | Maekawa |
| 6,878,772 B2 | 4/2005 | Visca |
| 6,911,417 B2 | 6/2005 | Chan |
| 6,923,921 B2 | 8/2005 | Flynn |
| 6,945,327 B2 | 9/2005 | Ely |
| 6,972,274 B1 | 12/2005 | Slikta |
| 7,041,728 B2 | 5/2006 | Zipplies |
| 7,045,571 B2 | 5/2006 | Tan |
| 7,053,146 B2 | 5/2006 | Morschhäuser |
| 7,064,170 B2 | 6/2006 | Kaspar |
| 7,074,862 B2 | 7/2006 | Kaspar |
| 7,084,094 B2 | 8/2006 | Gunn |
| 7,094,829 B2 | 8/2006 | Audenaert |
| 7,097,910 B2 | 8/2006 | Moore |
| 7,122,608 B1 | 10/2006 | Brinati |
| 7,125,941 B2 | 10/2006 | Kaulbach |
| 7,126,016 B2 | 10/2006 | Fu |
| 7,141,537 B2 | 11/2006 | Audenaert |
| 7,165,613 B2 | 1/2007 | Chan |
| 7,214,736 B2 | 5/2007 | Audenaert |
| 7,279,522 B2 | 10/2007 | Dadalas |
| 7,291,688 B2 | 11/2007 | Qiu |
| 7,297,744 B2 | 11/2007 | Kapeliouchko |
| 7,342,066 B2 | 3/2008 | Dadalas |
| 7,351,342 B2 | 4/2008 | Funaki |
| 7,417,099 B2 | 8/2008 | Savu |
| 7,425,279 B2 | 9/2008 | Coté |
| 7,566,762 B2 | 7/2009 | Otsuka |
| 7,585,817 B2 | 9/2009 | Pope |
| 7,629,298 B2 | 12/2009 | Arco |
| 7,659,333 B2 | 2/2010 | Hintzer |
| 7,671,112 B2 | 3/2010 | Hintzer |
| 7,678,426 B2 | 3/2010 | Flynn |
| 7,682,771 B2 | 3/2010 | Liu |
| 7,696,268 B2 | 4/2010 | Tsuda |
| 7,745,653 B2 | 6/2010 | Iyer |
| 7,754,795 B2 | 7/2010 | Hintzer |
| 7,772,162 B2 | 8/2010 | Pope |
| 7,776,946 B2 | 8/2010 | Hintzer |
| 7,795,375 B2 | 9/2010 | Shirakawa |
| 7,803,894 B2 | 9/2010 | Dams |
| 7,838,608 B2 | 11/2010 | Hintzer |
| 7,855,169 B2 | 12/2010 | Pope |
| 8,002,886 B2 | 8/2011 | Clark |
| 8,043,998 B2 | 10/2011 | Pope |
| 8,138,127 B2 | 3/2012 | Pope |
| 8,176,981 B2 | 5/2012 | Savu |
| 8,236,737 B2 | 8/2012 | Fan |
| 8,261,825 B2 | 9/2012 | Pope |
| 8,403,050 B2 | 3/2013 | Pope |
| 8,418,759 B2 | 4/2013 | Moore |
| 2002/0091212 A1 | 7/2002 | Abusleme |
| 2003/0092581 A1 | 5/2003 | Crews |
| 2003/0224112 A1 | 12/2003 | Dams |
| 2004/0010156 A1 | 1/2004 | Kondo |
| 2004/0077237 A1 | 4/2004 | Audenaert |
| 2004/0082745 A1 * | 4/2004 | Kantamneni et al. .......... 526/245 |
| 2004/0116742 A1 | 6/2004 | Guerra |
| 2004/0242755 A1 | 12/2004 | Araki |
| 2005/0027063 A1 | 2/2005 | Audenaert |
| 2005/0090613 A1 | 4/2005 | Maruya |
| 2005/0154104 A1 | 7/2005 | Malvasi |
| 2005/0228127 A1 | 10/2005 | Tatemoto |
| 2005/0244641 A1 | 11/2005 | Vincent |
| 2006/0045979 A1 | 3/2006 | Dams |
| 2006/0199029 A1 * | 9/2006 | Liu et al. ...................... 428/500 |
| 2006/0264334 A1 | 11/2006 | Gupta |
| 2006/0281946 A1 | 12/2006 | Morita |
| 2007/0004848 A1 | 1/2007 | Hintzer |
| 2007/0015669 A1 | 1/2007 | Zhang |
| 2007/0015865 A1 | 1/2007 | Hintzer |
| 2007/0029085 A1 | 2/2007 | Panga |
| 2007/0117915 A1 | 5/2007 | Funaki |
| 2007/0155891 A1 | 7/2007 | Tsuda |
| 2007/0197717 A1 | 8/2007 | Ueda |
| 2007/0225176 A1 | 9/2007 | Pope |
| 2007/0276103 A1 | 11/2007 | Guerra |
| 2008/0015304 A1 | 1/2008 | Hintzer |
| 2008/0015319 A1 | 1/2008 | Hintzer |
| 2008/0051551 A1 * | 2/2008 | Pope et al. .................... 528/226 |
| 2009/0149616 A1 | 6/2009 | Audenaert |
| 2009/0281002 A1 | 11/2009 | Casper |
| 2010/0152071 A1 | 6/2010 | Pope |
| 2010/0168300 A1 | 7/2010 | Dams |
| 2010/0181068 A1 | 7/2010 | Pope |
| 2010/0183889 A1 | 7/2010 | Dams |
| 2010/0224361 A1 | 9/2010 | Pope |
| 2010/0270019 A1 | 10/2010 | Pope |
| 2010/0270020 A1 | 10/2010 | Baran, Jr. |
| 2010/0270021 A1 | 10/2010 | Baran, Jr. |
| 2010/0276142 A1 | 11/2010 | Skildum |
| 2011/0056689 A1 * | 3/2011 | Baran et al. ................ 166/280.2 |
| 2011/0124532 A1 | 5/2011 | Maurer |
| 2011/0124782 A1 | 5/2011 | Dams |
| 2011/0136704 A1 | 6/2011 | Sharma |
| 2011/0177983 A1 | 7/2011 | Baran, Jr. |
| 2011/0201531 A1 | 8/2011 | Sharma |
| 2011/0247823 A1 | 10/2011 | Dams |
| 2012/0097393 A1 | 4/2012 | Dams |

FOREIGN PATENT DOCUMENTS

| | | |
|---|---|---|
| DE | 3 828 063 | 2/1990 |
| EP | 0 525 660 | 2/1993 |
| EP | 0 625 526 | 11/1994 |
| EP | 0 712 882 | 5/1996 |
| EP | 0870778 | 10/1998 |
| EP | 1369453 A1 * | 12/2003 |
| GB | 1 194 431 | 6/1970 |
| GB | 1 352 560 | 5/1974 |
| GB | 2031482 | 4/1980 |
| JP | 61-285426 | 12/1986 |
| JP | 2002-308914 | 10/2002 |
| JP | 2002-317003 | 10/2002 |
| JP | 2003-027079 | 1/2003 |
| JP | 2003-043625 | 2/2003 |
| JP | 2003-119204 | 4/2003 |
| JP | 2003-212919 | 7/2003 |
| JP | 2004-018394 | 1/2004 |
| JP | 2004-358397 | 12/2004 |
| JP | 2004-359870 | 12/2004 |
| JP | 2007-106958 | 4/2007 |
| SU | 1706204 | 11/1994 |
| WO | WO 98-50603 | 11/1998 |
| WO | WO 03-018508 | 3/2003 |
| WO | WO 02-20676 | 10/2003 |
| WO | WO 03/089540 | 10/2003 |
| WO | WO 2005/028589 A1 | 3/2005 |
| WO | WO 2005/035936 A1 | 4/2005 |
| WO | WO 2005-063827 | 7/2005 |
| WO | WO 2005-065800 | 7/2005 |
| WO | WO 2005-092520 | 10/2005 |
| WO | WO 2005-121290 | 12/2005 |
| WO | WO 2005-123646 | 12/2005 |
| WO | WO 2007-017806 | 2/2007 |
| WO | WO 2007/033489 | 3/2007 |
| WO | WO 2007/097975 | 8/2007 |
| WO | WO 2008/070704 | 6/2008 |
| WO | WO 2012/088056 | 6/2012 |
| WO | WO 2012/088216 | 6/2012 |
| WO | WO 2012/125219 | 9/2012 |

OTHER PUBLICATIONS

Ai-Anazi et al., "A Successful Methanol Treatment in a Gas-Condensate Reservoir: Field Application". Mar. 2003, SPE 80901, Society of Petroleum Engineers Inc., pp. 1-9.

Chi, "A Facile Synthesis of Partly-fluorinated Ethers Using Perfluroporpoxyethylene and Aliphatic Alcohols", Bull, Korean Chem. Soc., 1999, vol. 20, No. 2, pp. 220-222.

(56) References Cited

OTHER PUBLICATIONS

Clark, H. B., et al., "Use of Fluorochemical Surfactants in Nonagueous Stimulation Fields," *Journal of Petroleum Chemistry* vol. 32, No. 10 (1980) p. 1695-1697.

Crema et al., "Foaming of Anhydrous Methanol for Well Stimulation", Apr. 1985, SPE 13565, Society of Petroleum Engineers Inc., 4 pages.

England, "Catalytic Conversion of Fluoroalkyl Alkyl Ethers to Carbonyl Compounds", J. Org. Chem., 1984, vol. 49, pp. 4007-4008.

Fahes, "Wettability Alteration to Intermediate Gas-Wetting in Gas-Condensate Reservoirs at High Temperatures", Oct. 9-12, 2005, SPE Annual Technical Conference and Exhibition, Dallas, TX, pp. 1-14, SPE 96184.

Karsa, "Industrial Applications of Surfactants", The Proceedings of a Symposium organized by the North West Region of the Industrial Division of the Royal Society of Chemistry, The Royal Society of Chemistry, 4 pages (1987).

Kumar, "Improving the Gas and Condensate Relative Permeability Using Chemical Treatments", May 15-17, 2006, SPE Gas Technology Symposium, Calgary; Alberta, pp. 1-9. SPE 100529.

Li, K. et al., "Experimental Study of Wettability Alteration to Preferential Gas -Wetting in Porous Media and Its Effects", SPE Reservoir Eval. and Eng 3 (2), pp. 139-149.

McLeod, "The Use of Alcohol in Gas Well Stimulation", Nov. 10-11, 1966, SPE Eastern Regional Meeting, Columbus, Ohio, pp. 1-13. SPE 1663.

Noh et al., "Experimental Study of Wettability Alteration for Reservoir Rock", Project 3—Gas Condensate Reservoirs Part 2, Reservoir Engineering Research Institute, Apr. 1-Jun. 30, 2Q.05.

Noh et al., "Effect of Wettability on High-Velocity Coefficient in Two-Phase Gas-Liquid Flow", SPE 102773, 2006 SPE Annual Technical Conference and Exhibition held in San Antonio, TX, Sep. 24-27, 2006.

Panga, "Preventive Treatment for Enhancing Water Removal from Gas Reservoirs by Wettability Alteration", Mar. 11-14, 2007, 15th SPE Middle East Oil & Gas Show and Conference, Kingdom of Bahrain, pp. 1-12, SPE 105367.

Rosen, "Surfactants and Interfacial Phenomena", John Wiley & Sons, NY, pp. ix-xiv, (1978).

Sullivan, "Synthesis of Perfluoroalkyl Vinyl Ether Acids and Derivatives," Perfluoroalkyl Vinyl Ether Acids, Jun. 1969, vol. 34, No. 6, p. 1841-1844.

Tang, "Relative Permeability Modification in Gas/Liquid Systems Through Wettability Alteration to Intermediate Gas Wetting", SPE Reservoir Evaluation and Engineering, Dec. 2002, vol. 5, No. 6, pp. 427-436, SPE 81195.

Tonelli, "Linear Perfluoropolyether Difunctional Oligomers: Chemistry, Properties and Applications", J. Fluorine Chem., 1999, vol. 95, pp. 51-70.

International Search Report from PCT/US2009/068393, mailed Apr. 1, 2010, 7 pgs.

\* cited by examiner

METHOD OF CONTACTING HYDROCARBON-BEARING FORMATIONS WITH FLUORINATED ETHER COMPOSITIONS

CROSS-REFERENCE TO RELATED APPLICATION

This application claims the benefit of U.S. Provisional Patent Application No. 61/138,766, filed Dec. 18, 2008, the disclosure of which is incorporated by reference herein in its entirety.

BACKGROUND

In the oil and gas industry, certain surfactants (including certain fluorinated surfactants) are known as fluid additives for various downhole operations (e.g., fracturing, waterflooding, and drilling). Often, these surfactants function to decrease the surface tension of the fluid or to stabilize foamed fluids.

Some hydrocarbon and fluorochemical compounds have been used to modify the wettability of reservoir rock, which may be useful, for example, to prevent or remedy water blocking (e.g., in oil or gas wells) or liquid hydrocarbon accumulation (e.g., in gas wells) in the vicinity of the wellbore (i.e., the near wellbore region). Water blocking and liquid hydrocarbon accumulation may result from natural phenomena (e.g., water-bearing geological zones or condensate banking) and/or operations conducted on the well (e.g., using aqueous or hydrocarbon fluids). Water blocking and condensate banking in the near wellbore region of a hydrocarbon-bearing geological formation can inhibit or stop production of hydrocarbons from the well and hence are typically not desirable. Not all hydrocarbon and fluorochemical compounds, however, provide the desired wettability modification.

Solvent injection (e.g., injection of methanol) has been used to alleviate the problems of water blocking and condensate banking in gas wells, but this method may provide only a temporary benefit, and may not be desirable under some downhole conditions.

SUMMARY

Methods of treating a hydrocarbon-bearing formation disclosed herein may be useful, for example, for increasing the permeability in hydrocarbon-bearing formations wherein two phases (i.e., a gas phase and an oil phase) of the hydrocarbons are present, (e.g., in gas wells having retrograde condensate and oil wells having black oil or volatile oil). The methods are also typically useful for increasing the permeability in hydrocarbon-bearing formations having brine (e.g., connate brine and/or water blocking). Treatment of a near wellbore region of an oil and/or gas well that has at least one of brine or two phases of hydrocarbons in the near wellbore region using the methods disclosed herein may increase the productivity of the well. Although not wishing to be bound by theory, it is believed that the fluoroether compounds generally adsorb to at least one of hydrocarbon-bearing formations or proppants under downhole conditions and modify the wetting properties of the rock in the formation to facilitate the removal of hydrocarbons and/or brine. The fluoroether compound may remain on the rock for the duration of an extraction of hydrocarbons from the formation (e.g., 1 week, 2 weeks, 1 month, or longer). The fluoroether compounds disclosed herein are partially fluorinated polyether groups and/or have fully fluorinated polyether groups with a low number (e.g., up to 6 or 4) continuous perfluorinated carbon atoms, but they provide wettability modification that may be expected from compounds having a higher number of fluorine atoms. Thus the compounds disclosed herein have a high fluorine efficiency, which may provide advantages, for example, in manufacturing cost.

In one aspect, the present disclosure provides a method comprising contacting a hydrocarbon-bearing formation with a treatment composition comprising solvent and a fluoroether compound, wherein the fluoroether compound comprises at least one first divalent unit represented by formula:

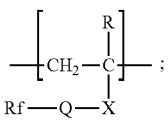

wherein
each Rf is independently selected from the group consisting of:

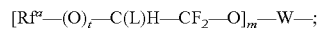

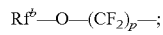

$F(C_kF_{2k})$—$(O-C_kF_{2k})_p$—O—$CF_2$—; and

each Q is independently selected from the group consisting of a bond, —C(O)—N(R$^1$)—, and —C(O)—O—;
each X is independently selected from the group consisting of alkylene and arylalkylene, wherein alkylene and arylalkylene are each optionally interrupted by at least one ether linkage and optionally terminated by —N(R$^1$)—C(O)— or —O—C(O)—;
R and R$^1$ are each independently selected from the group consisting of hydrogen and alkyl having from 1 to 4 carbon atoms;
Rf$^a$ represents a partially or fully fluorinated alkyl group having from 1 to 6 carbon atoms and optionally interrupted with at least one oxygen atom;
Rf$^b$ is selected from the group consisting of $CF_3CFH$— and $F(C_jF_{2j})$—;
L is selected from the group consisting of F and $CF_3$;
L' is F or H;
W is selected from the group consisting of alkylene and arylene;
L$^1$ is selected from the group consisting of —$CF_2$—, —$CF_2CF_2$—, and —$CF(CF_3)$—;
t is 0 or 1, wherein when Rf is represented by formula Rf$^a$—(O)$_t$—CHF—(CF$_2$)$_n$— and t is 0, then Rf$^a$ is interrupted with at least one oxygen atom;
m is 1, 2, or 3;
n is 0 or 1;
j is an value from 1 to 4;
each k is independently 1 or 2;
each p is independently an value from 1 to 6; and
z is an value from 0 to 3.
The fluoroether compound typically further comprises at least one of a divalent unit comprising a hydrophilic group (e.g., a polyalkyleneoxy segment or a cationic, anionic, or amphoteric functional group(s)) or a divalent unit comprising a silane group.

In another aspect, the present disclosure provides a hydrocarbon-bearing formation comprising a surface, wherein at least a portion of the surface is contacted according to a method disclosed herein.

In another aspect, the present disclosure provides a hydrocarbon-bearing formation comprising a surface, wherein at least a portion of the surface is in contact with a fluorinated siloxane, the fluorinated siloxane comprising at least one condensation product of a fluorinated silane comprising at least one divalent unit represented by formula:

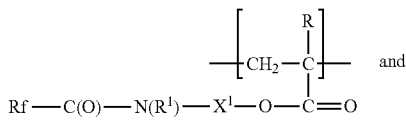

at least one divalent unit represented by formula:

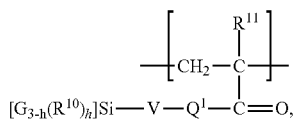

wherein
each Rf is independently selected from the group consisting of:

$Rf^a$—(O)$_t$—CHL'-(CF$_2$)$_n$—;

[$Rf^a$—(O)$_t$—C(L)H—CF$_2$—O]$_m$—W—;

$Rf^b$—O—(CF$_2$)$_p$—;

F(C$_k$F$_{2k}$)—(O—C$_k$F$_{2k}$)$_p$—O—CF$_2$—; and

CF$_3$—O—(CF$_2$)$_3$—(OCF(CF$_3$)—CF$_2$)$_z$—O-L$^1$-;

$Rf^a$ represents a partially or fully fluorinated alkyl group having from 1 to 6 carbon atoms and optionally interrupted with at least one oxygen atom;
$Rf^b$ is selected from the group consisting of CF$_3$CFH— and F(C$_j$F$_{2j}$)—;
L is selected from the group consisting of F and CF$_3$;
W is selected from the group consisting of alkylene and arylene;
L' is F or H;
L$^1$ is selected from the group consisting of —CF$_2$—, —CF$_2$CF$_2$—, and —CF(CF3)-;
t is 0 or 1, wherein when Rf is represented by formula $Rf^a$—(O)$_t$—CHL'-(CF$_2$)$_n$— and t is 0, then $Rf^a$ is interrupted with at least one oxygen atom;
m is 1, 2, or 3;
n is 0 or 1;
each j is independently an value from 1 to 4;
each k is independently 1 or 2;
each p is independently an value from 1 to 6;
z is an value from 0 to 3;
X$^1$ is independently selected from the group consisting of alkylene and arylalkylene, and wherein alkylene and arylalkylene are each optionally interrupted by at least one ether linkage;
each R$^{10}$ is independently selected from the group consisting of alkyl having from 1 to 6 carbon atoms and aryl;
Q$^1$ is selected from the group consisting of —O—, —S—, and —N(R$^1$)—;

R, R$^1$, and R$^{11}$ are each independently selected from the group consisting of hydrogen and alkyl having from 1 to 4 carbon atoms;
V is alkylene that is optionally interrupted by at least one ether linkage or amine linkage;
each G is independently selected from the group consisting of hydroxyl, alkoxy, acyloxy, and halogen; and
h is 0, 1, or 2.

In some embodiments of the foregoing aspects, the hydrocarbon-bearing formation is penetrated by a wellbore, wherein a region near the wellbore is treated with the treatment composition. In some of these embodiments, the method further comprises obtaining (e.g., pumping or producing) hydrocarbons from the wellbore after treating the hydrocarbon-bearing formation with the treatment composition.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The term "brine" refers to water having at least one dissolved electrolyte salt therein (e.g., having any nonzero concentration, and which may be less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or even greater than 200,000 ppm).

The term "hydrocarbon-bearing formation" includes both hydrocarbon-bearing formations in the field (i.e., subterranean hydrocarbon-bearing formations) and portions of such hydrocarbon-bearing formations (e.g., core samples).

The term "contacting" includes placing a treatment composition within a hydrocarbon-bearing formation using any suitable manner known in the art (e.g., pumping, injecting, pouring, releasing, displacing, spotting, or circulating the treatment composition into a well, wellbore, or hydrocarbon-bearing formation).

The term "solvent" refers to a homogeneous liquid material (inclusive of any water with which it may be combined) that is capable of at least partially dissolving the fluoroether compound disclosed herein at 25° C.

"Alkyl group" and the prefix "alk-" are inclusive of both straight chain and branched chain groups and of cyclic groups. Unless otherwise specified, alkyl groups herein have up to 20 carbon atoms. Cyclic groups can be monocyclic or polycyclic and, in some embodiments, have from 3 to 10 ring carbon atoms.

The phrase "interrupted by at least one functional group", for example, with regard to an alkyl (which may or may not be fluorinated), alkylene, or arylalkylene refers to having part of the alkyl, alkylene, or arylalkylene on both sides of the functional group.

The term "polymer" refers to a molecule having a structure which essentially includes the multiple repetition of units derived, actually or conceptually, from molecules of low relative molecular mass. The term "polymer" encompasses oligomers.

The term "fluoroalkyl group" includes linear, branched, and/or cyclic alkyl groups in which all C—H bonds are replaced by C—F bonds as well as groups in which hydrogen or chlorine atoms are present instead of fluorine atoms provided that up to one atom of either hydrogen or chlorine is present for every two carbon atoms. In some embodiments of fluoroalkyl groups, when at least one hydrogen or chlorine is present, the fluoroalkyl group includes at least one trifluoromethyl group.

The term "productivity" as applied to a well refers to the capacity of a well to produce hydrocarbons (i.e., the ratio of the hydrocarbon flow rate to the pressure drop, where the pressure drop is the difference between the average reservoir pressure and the flowing bottom hole well pressure (i.e., flow per unit of driving force)).

The region near the wellbore (i.e., near wellbore region) includes a region within about 25 feet (in some embodiments, 20, 15, or 10 feet) of the wellbore.

All numerical ranges are inclusive of their endpoints and nonintegral values between the endpoints unless otherwise stated.

BRIEF DESCRIPTION OF THE DRAWINGS

For a more complete understanding of the features and advantages of the present disclosure, reference is now made to the detailed description along with the accompanying figures and in which.

DETAILED DESCRIPTION

Figure 1:
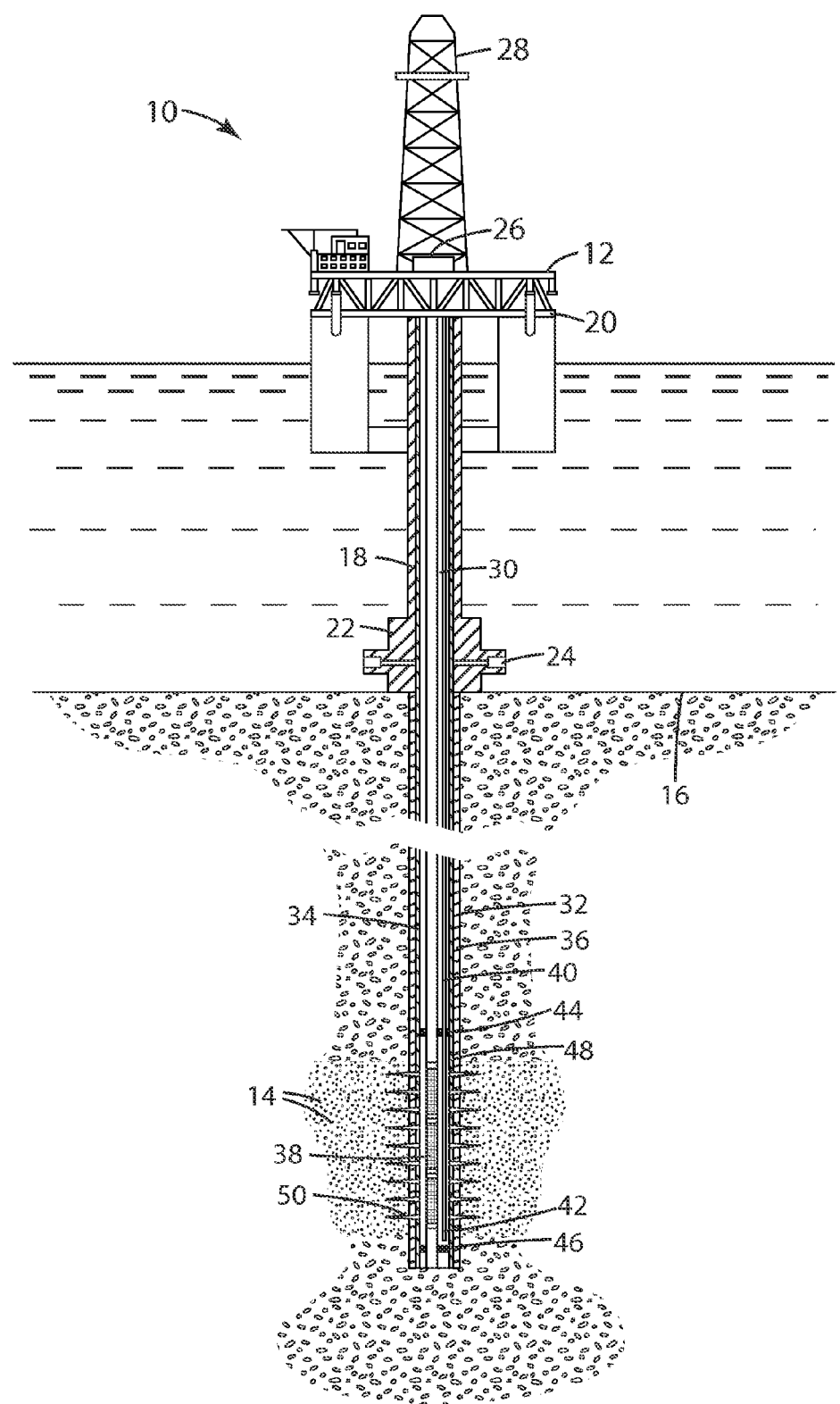
FIG. 1 is a schematic illustration of an exemplary embodiment of an offshore oil platform operating an apparatus for progressively treating a near wellbore region according to some embodiments of the present disclosure.

Fluoroether compounds useful for practicing the present disclosure comprise at least one (e.g., at least 1, 2, 5, 10, 15, 20, 25, or even at least 50) first divalent unit represented by Formula I:

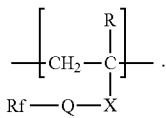

Each Rf is independently selected from the group consisting of:

$Rf^a$—(O)$_t$—CHL'-(CF$_2$)$_n$—      II;

[$Rf^a$—(O)$_t$—C(L)H—CF$_2$—O]$_m$—W—      III;

$Rf^b$—O—(CF$_2$)$_p$—      IV;

F(C$_k$F$_{2k}$)—(O—C$_k$F$_{2k}$)$_p$—O—CF$_2$—      V; and

CF$_3$—O—(CF$_2$)$_3$—(OCF(CF$_3$)—CF$_2$)$_z$—O-L$^1$      VI.

In some embodiments of Formula I, Rf is selected from the group consisting of $Rf^a$—(O)$_t$—CHL'-(CF$_2$)$_n$—, [$Rf^a$—(O)$_t$—C(L)H—CF$_2$—O]$_m$—W—, and CF$_3$CFH—O—(CF$_2$)$_p$—. In some embodiments of Formula I, Rf is selected from the group consisting of F(C$_j$F$_{2j}$)—O—(CF$_2$)$_p$—, F(C$_k$F$_{2k}$)—(O—C$_k$F$_{2k}$)$_p$—O—CF$_2$—, and CF$_3$—O—(CF$_2$)$_3$—(OCF(CF$_3$)—CF$_2$)$_z$—O-L$^1$—. In some embodiments of Formula I, Rf is selected from the group consisting of $Rf^a$—(O)$_t$—CHL'-(CF$_2$)$_n$— and [$Rf^a$—(O)$_t$—C(L)H—CF$_2$—O]$_m$—W—. In some embodiments of Formula I, Rf is selected from the group consisting of $Rf^a$—(O)$_t$—CHL'-(CF$_2$)$_n$—, F(C$_k$F$_{2k}$)—(O—C$_k$F$_{2k}$)$_p$—O—CF$_2$—, and CF$_3$—O—(CF$_2$)$_3$—(OCF(CF$_3$)—CF$_2$)$_z$—O-L$^1$.

In some embodiments of Formula I, Rf has a molecular weight of up to 600 grams per mole (in some embodiments, up to 500, 400, or even up to 300 grams per mole).

In formulas II and III, $Rf^a$ represents a partially or fully florinated alkyl group having from 1 to 6 carbon atoms and optionally interrupted with at least one oxygen atom. $Rf^a$ includes linear and branched alkyl groups. In some embodiments, $Rf^a$ is linear. In some embodiments, $Rf^a$ represents fully fluorinated alkyl group having up to 6 (in some embodiments, 5, 4, 3, 2, or 1) carbon atoms. In some embodiments, $Rf^a$ is a fully fluorinated alkyl group interrupted with at least one oxygen atom, of which the alkyl groups between oxygen atoms have up to 6 (in some embodiments, 5, 4, 3, 2, or 1) carbon atoms, and wherein the terminal alkyl group has up to 6 (in some embodiments, 5, 4, 3, 2, or 1) carbon atoms. In some embodiments, $Rf^a$ is a partially fluorinated alkyl group having up to 6 (in some embodiments, 5, 4, 3, 2, or 1) carbon atoms and up to 2 hydrogen atoms. In some embodiments, $Rf^a$ is a partially fluorinated alkyl group having up 2 hydrogen atoms interrupted with at least one oxygen atom, of which the alkyl groups between oxygen atoms have up to 6 (in some embodiments, 5, 4, 3, 2, or 1) carbon atoms, and wherein the terminal alkyl group has up to 6 (in some embodiments, 5, 4, 3, 2, or 1) carbon atoms.

In some embodiments of Formulas II and III, $Rf^a$ is represented by formula $R_f^1$—[OR$_f^2$]$_x$—.

$R_f^1$ is a perfluorinated alkyl group having from 1 to 3 (in some embodiments, 1 to 2) carbon atoms. Each $R_f^2$ is independently perfluorinated alkylene having from 1 to 3 carbon atoms. x is a value from 1 to 4 (i.e., 1, 2, 3, or 4). In some of these embodiments, t is 1.

In some embodiments of Formulas II and III, $Rf^a$ is represented by formula $R_f^4$—[OR$_f^5$]$_a$—O—CF$_2$—.

$R_f^4$ is a perfluorinated alkyl group having from 1 to 3 (in some embodiments, 1 to 2) carbon atoms. Each $R_f^5$ is independently perfluorinated alkylene having from 1 to 3 carbon atoms. "a" is a value from 0 to 4 (i.e., 0, 1, 2, 3, or 4). In some of these embodiments, t is 0.

In some embodiments of Formulas II and III, $Rf^a$ is represented by formula $R_f^4$—(OCF$_2$)$_p$—, wherein p is an value of 1 to 6 (in some embodiments, 1 to 4 or 1 to 3), and $R_f^7$ is selected from the group consisting of a partially fluorinated alkyl group having 1, 2, 3, 4, 5, or 6 carbon atoms and 1 or 2 hydrogen atoms and a fully fluorinated alkyl group having 1, 2, 3 or 4 carbon atoms.

In some embodiments of Formulas II and III, $Rf^a$ is represented by formula: $R_f^8$—O—(CF$_2$)$_p$—, wherein p is an value of 1 to 6 (in some embodiments, 1 to 4 or 1 to 3) and $R_f^8$ is selected from the group consisting of a partially fluorinated alkyl group having 1, 2, 3, 4, 5, or 6 carbon atoms and 1 or 2 hydrogen atoms and a fully fluorinated alkyl group having 1, 2, 3 or 4 carbon atoms.

$Rf^b$ is selected from the group consisting of CF$_3$CFH— and F(C$_j$F$_{2j}$)—. In some embodiments of Formula IV, $Rf^b$ is CF$_3$CFH—. In other embodiments, $Rf^b$ is F(C$_j$F$_{2j}$)—, wherein j is an value from 1 to 4 (i.e., CF$_3$—, C$_2$F$_5$—, C$_3$F$_7$—, and $C_4F_9$—). In some embodiments, j is 1. In some embodiments, $Rf^b$ is $F(C_jF_{2j})$—, and p+j has a value of 3 to 7.

In Formula II, L' is F or H. In some embodiments, L' is F. In some embodiments, L' is H.

In Formula III, L is selected from the group consisting of F and $CF_3$. In some embodiments of Formula III, L is F. In other embodiments, L is $CF_3$.

In Formula III, W is selected from the group consisting of alkylene and arylene. Alkylene includes linear, branched, and cyclic alkylene groups having from 1 to 10 (in some embodiments, 1 to 4) carbon atoms. In some embodiments, W is methylene. In some embodiments, W is ethylene. Arylene includes groups having 1 or 2 aromatic rings, optionally having at least one heteroatom (e.g., N, O, and S) in the ring, and optionally substituted with at least one alkyl group or halogen atom. In some embodiments, W is phenylene.

In Formulas II and III, t is 0 or 1. In some embodiments, t is 1. In some embodiments, t is 0. In embodiments wherein t is 0, $Rf^a$ is typically interrupted by at least one oxygen atom.

In Formula III, m is 1, 2, or 3. In some embodiments, m is 1.

In Formula II, n is 0 or 1. In some embodiments, n is 0. In some embodiments, n is 1.

In Formulas IV and V, p is an value from 1 to 6 e.g., 1, 2, 3, 4, 5, or 6). In some embodiments, p is 1, 2, 5, or 6. In some embodiments, p is 3. In some embodiments, p is 1 or 2. In some embodiments, p is 5 or 6.

In Formula V, each k is independently 1 or 2. In some embodiments, k is I.

In Formula VI, $L^1$ is selected from the group consisting of —$CF_2$—, —$CF_2CF_2$—, and —$CF(CF_3)$—. In some embodiments, $L^1$ is selected from the group consisting of —$CF_2$— and —$CF_2CF_2$—. In some embodiments, $L^1$ is —$CF_2$—.

In Formula VI, z is an value from 0 to 3 (e.g., 0, 1, 2, or 3). In some embodiments, z is 0.

In some embodiments, fluoroether compounds useful for practicing the present disclosure have an Rf group represented by Formula IV (i.e., $Rf^b$—O—$(CF_2)_p$—). In some embodiments, $Rf^b$ is $CF_3CFH$—. In some embodiments wherein Rf is represented by Formula IV, Rf is $CF_3CFH$—O—$(CF_2)_3$— or $CF_3CFH$—O—$(CF_2)_5$—. In other embodiments wherein Rf is represented by Formula IV, Rf is $CF_3CF_2$—O—$(CF_2)_3$— or $CF_3CF_2$—O—$(CF_2)_5$—. In other embodiments wherein Rf is represented by Formula IV, Rf is:

$CF_3$—O—$CF_2$—$CF_2$—;

$C_2F_5$—O—$CF_2$—$CF_2$—;

$C_3F_2$—O—$CF_2$—$CF_2$—; or $C_4F_9$—O—$CF_2$—$CF_2$—.

In other embodiments wherein Rf is represented by Formula IV, Rf is $C_3F_2$—O—$CF_2$—.

In some embodiments, fluoroether compounds useful for practicing the present disclosure have an Rf group represented by Formula II. In some of these embodiments, Rf is:

$C_3F_7$—O—CHF—;

$CF_3$—O—$CF_2CF_2$—$CF_2$—O—CHF—;

$CF_3CF_2CF_2$—O—$CF_2CF_2$—$CF_2$—O—CHF—;

$CF_3$—O—$CF_2$—$CF_2$—O—CHF—;

$CF_3$—O—$CF_2$—O—$CF_2$—$CF_2$—O—CHF—;

$CF_3$—(O—$CF_2)_2$—O—$CF_2$—$CF_2$—O—CHF—; or $CF_3$—(O—$CF_2)_3$—O—$CF_2$—$CF_2$—O—CHF—.

In other of these embodiments, Rf is:

$CF_3$—O—CHF—$CF_2$—;

$CF_3$—O—$CF_2$—$CF_2$—O—CHF—$CF_2$—;

$CF_3$—$CF_2$—O—CHF—$CF_2$—;

$CF_3$—O—$CF_2$—$CF_2$—$CF_2$—O—CHF—$CF_2$—;

$CF_3$—O—$CF_2$—O—$CF_2$—$CF_2$—O—CHF—$CF_2$—;

$CF_3$—(O—$CF_2)_2$—O—$CF_2$—$CF_2$—O—CHF—$CF_2$—; or $CF_3$—(O—$CF_2)_3$—O—$CF_2$—$CF_2$—O—CHF—$CF_2$—.

In other of these embodiments, Rf is:

$CF_3$—O—$CF_2$—CHF—;

$C_3F_7$—O—$CF_2$—CHF—;

$CF_3$—O—$CF_2$—$CF_2$—$CF_2$—O—$CF_2$—CHF—;

$CF_3$—O—$CF_2$—O—$CF_2$—$CF_2$—O—$CF_2$—CHF—;

$CF_3$—(O—$CF_2)_2$—O—$CF_2$—$CF_2$—O—$CF_2$—CHF—; or $CF_3$—(O—$CF_2)_3$—O—$CF_2$—$CF_2$—O—$CF_2$—CHF—.

In other of these embodiments, Rf is:

$CF_3$—O—$CF_2$—CHF—$CF_2$—;

$C_2F_5$—O—$CF_2$—CHF—$CF_2$—;

$C_3F_2$—O—$CF_2$—CHF—$CF_2$—;

$CF_3$—O—$CF_2$—$CF_2$—$CF_2$—O—$CF_2$—CHF—$CF_2$—;

$CF_3$—O—$CF_2$—O—$CF_2$—$CF_2$—O—$CF_2$—CHF—$CF_2$—;

$CF_3$—(O—$CF_2)_2$—O—$CF_2$—$CF_2$—O—$CF_2$—CHF—$CF_2$—; or $CF_3$—(O—$CF_2)_3$—O—$CF_2$—$CF_2$—O—$CF_2$—CHF—$CF_2$—.

In other of these embodiments, Rf is:

$CF_3$—O—$CF_2CF_2$—$CF_2$—O—CHF—;

$CF_3$—O—$CF_2$—$CF_2$—$CF_2$—O—CHF—$CF_2$—;

$CF_3$—O—$CF_2$—$CF_2$—$CF_2$—O—$CF_2$—CHF—; or $CF_3$—O—$CF_2$—$CF_2$—$CF_2$—O—$CF_2$—CHF—$CF_2$—.

In yet other of these embodiments, Rf is $CF_3CF_2CF_2$—O—$CH_2$—$CF_2$—.

In some embodiments, fluoroether compounds useful for practicing the present disclosure have an Rf group represented by Formula III. In some of these embodiments, L is F, m is 1, and W is alkylene. In some of these embodiments, Rf is:

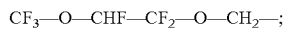

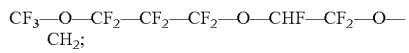

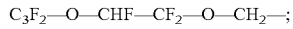

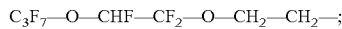

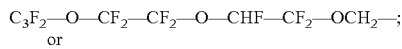

or

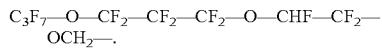

In other of these embodiments, Rf is represented by formula $C_3F_7$—O—$CF_2$—CHF—$CF_2$—$OCH_2$—. In other of these embodiments, Rf is $CF_3$—CHF—$CF_2$—O—$CH_2$— or $C_3F_7$—$CF_2$—CHF—$CF_2$—$OCH_2$—.

In some embodiments, fluoroether compounds useful for practicing the methods disclosed herein have an Rf group represented by Formula V (i.e., $F(C_kF_{2k})$—(O—$C_kF_{2k})_p$—O—$CF_2$—). In some of these embodiments, p is 1, 2, or 3. In some of these embodiments, k is 1. In some of these embodiments, Rf is:

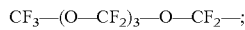

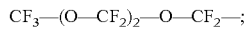

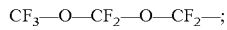

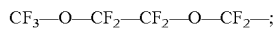

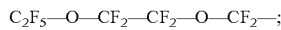

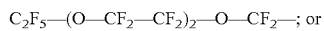; or

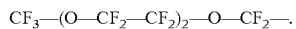.

In some embodiments, fluoroether compounds useful for practicing the present disclosure have an Rf represented by Formula VI (i.e., $CF_3$—O—$(CF_2)_3$—$(OCF(CF_3)$—$CF_2)_z$—O-$L^1$-). In some of these embodiments, z is 0, and $L^1$ is —$CF_2$— or —$CF_2CF_2$—. In some of these embodiments, Rf is $CF_3$—O—$CF_2$—$CF_2$—$CF_2$—O—$CF_2$—; in other of these embodiments, Rf is $CF_3$—O—$CF_2$—$CF_2$—$CF_2$—O—$CF_2CF_2$—.

In Formula I, each Q is independently a bond, —C(O)—$N(R^1)$—, or —C(O)—O—, wherein $R^1$ is hydrogen or alkyl of 1 to 4 carbon atoms (e.g., methyl, ethyl, n-propyl, isopropyl, n-butyl, isobutyl, or sec-butyl). In some embodiments, each Q is independently —C(O)—$N(R^1)$— or —C(O)—O—. In some embodiments, Q is —C(O)—$N(R^1)$—. In some embodiments, $R^1$ is hydrogen or methyl. In some embodiments, $R^1$ is hydrogen.

In Formula I, each X is independently alkylene or arylalkylene, wherein alkylene and arylalkylene are each optionally interrupted by at least one ether linkage (i.e., —O—) and optionally terminated by —$N(R^1)$—C(O)— or —O—C(O)—. In some embodiments, X is alkylene terminated by —O—C(O)—. In some embodiments, X is —$CH_2$—$CH_2$—O—C(O)—. In some embodiments, X is —$CH_2$—O—C(O)—.

In Formula I, R is hydrogen or alkyl of 1 to 4 carbon atoms (e.g., methyl, ethyl, n-propyl, isopropyl, n-butyl, isobutyl, or sec-butyl). In some embodiments, R is hydrogen or methyl.

In some embodiments of Formula I, each first divalent unit is represented by formula Ia:

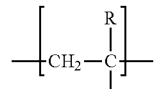

Ia wherein Rf, R, and $R^1$ are as defined above, each $X^1$ is independently alkylene or arylalkylene, wherein alkylene and arylalkylene are each optionally interrupted by at least one ether linkage (i.e., —O—). In some embodiments, each $X^1$ is independently alkylene. In some embodiments, $X^1$ is —$CH_2$—$CH_2$—. In some embodiments, X is —$CH_2$—.

Divalent units of Formula I can be prepared, for example, starting with a partially or fully fluorinated carboxylic acid, a salt thereof, a carboxylic acid ester, or a carboxylic acid halide. Partially and fully fluorinated carboxylic acids and salts thereof, carboxylic acid esters, and carboxylic acid halides can be prepared by known methods. For example, starting materials represented by formula $Rf^a$—(O)$_t$—CHF—$(CF_2)_n$—COY or $[Rf^a$—(O)$_t$—C(L)H—$CF_2$—O]$_m$—W—COY, wherein Y represents —OH, —O-alkyl (e.g., having from 1 to 4 carbon atoms), or —F, can be prepared from fluorinated olefins of Formula VII:

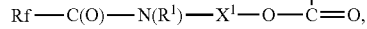
VII, wherein $Rf^a$ and t are as defined above. Numerous compounds of Formula VII are known (e.g., perfluorinated vinyl ethers and perfluorinated allyl ethers), and many can be obtained from commercial sources (e.g., 3M Company, St. Paul, Minn., and E.I. du Pont de Nemours and Company, Wilmington, Del.). Others can be prepared by known methods; (see, e.g., U.S. Pat. Nos. 5,350,497 (Hung et al.) and 6,255,536 (Worm et al.)).

Compounds of formula $Rf^a$—(O)$_t$—CHF—$(CF_2)_n$—COY, wherein n is 0, can be prepared, for example, by reacting a fluorinated olefin of Formula VII with a base (e.g., ammonia, alkali metal hydroxides, and alkaline earth metal hydroxides). Alternatively, for example, a fluorinated olefin of Formula VII can be reacted with an aliphatic alcohol (e.g., methanol, ethanol, n-butanol, and t-butanol) in an alkaline medium, and the resulting ether can be decomposed under acidic conditions to provide a fluorinated carboxylic acid of formula $Rf^a$—(O)$_t$—CHF—$(CF_2)_n$—COY, wherein n is 0. Compounds of formula $Rf^a$—(O)$_t$—CHF—$(CF_2)_n$—COY, wherein n is 1, can be prepared, for example, by a free radical reaction of the fluorinated olefin of Formula VII with methanol followed by an oxidation of the resulting reaction product using conventional methods. Conditions for these reactions are described, for example, in U.S. Pat. App. No. 2007/0015864 (Hintzer et al.), the disclosure of which, relating to the preparation of compounds of formula $Rf^a$—(O)$_t$—CHF—$(CF_2)_n$—COY, is incorporated herein by reference.

Fluorinated vinyl ethers of Formula VII, wherein t is 1, can be oxidized (e.g., with oxygen) in the presence of a fluoride source (e.g., antimony pentafluoride) to carboxylic acid fluorides of formula $Rf^a$—O—$CF_2C(O)F$ according to the methods described in U.S. Pat. No. 4,987,254 (Schwertfeger et al.), in column 1, line 45 to column 2, line 42, the disclosure of which is incorporated herein by reference. Examples of compounds that can be prepared according to this method include $CF_3$—$(CF_2)_2$—O—$CF_2$—C(O)—$CH_3$ and $CF_3$—O—$(CF_2)_3$—O—$CF_2$—C(O)—$CH_3$, which are described in U.S. Pat. No. 2007/0015864 (Hintzer et al.), the disclosure of which, relating to the preparation of these compounds, is incorporated herein by reference.

Compounds of formula [Rf$^a$—(O)$_t$—C(L)H—CF$_2$—O]$_m$—W—COY can be prepared, for example, by reaction of a fluorinated olefin of Formula VII with a hydroxyl compound of Formula VIII according to the reaction:

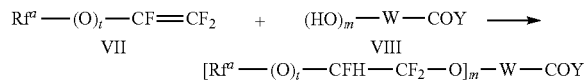

wherein Rf$^a$ and t are as defined above, m is 1, 2, or 3, W is alkylene or arylene, and Y is as defined above. Typically, Y represents —O-alkyl (e.g., having from 1 to 4 carbon atoms in the alkyl group). Compounds of Formula VIII can be obtained, for example, from commercial sources or can be prepared by known methods. The reaction can be carried out, for example, under conditions described in U.S. Pat. App. No. 2007/0015864 (Hintzer et al.), the disclosure of which, relating to the preparation of compounds of formula [Rf$^a$—(O)$_t$—C(L)H—CF$_2$—O]$_m$—W—COY, is incorporated herein by reference.

Fluorinated carboxylic acids and their derivatives according to formula Rf$^b$—O—(CF$_2$)$_p$—COY can be prepared, for example, by decarbonylation of difunctional perfluorinated acid fluoride according to the reaction:

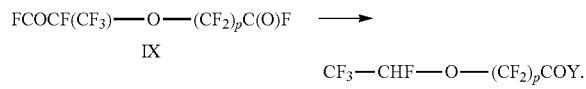

The reaction is typically carried out at an elevated temperature in the presence of water and base (e.g., a metal hydroxide or metal carbonate) according to known methods; see, e.g., U.S. Pat. No. 3,555,100 (Garth et al.), the disclosure of which, relating to the decarbonylation of difunctional acid fluorides, is incorporated herein by reference. The decarbonylation of compounds of Formula IX may also be carried out in the presence of a fluoride source (e.g., antimony pentafluoride) to provide compounds of formula CF$_3$—CF$_2$—O—(CF$_2$)$_p$COY.

Compounds of Formula IX are available, for example, from the coupling of perfluorinated diacid fluorides of Formula X and hexafluoropropylene oxide according to the reaction:

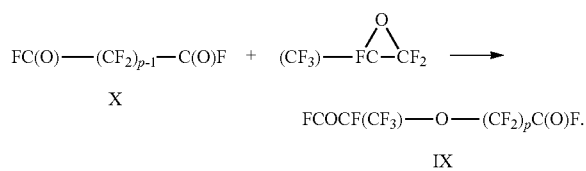

Compounds of Formula X are available, for example, by electrochemical fluorination or direct fluorination of a difunctional ester of formula CH$_3$OCO(CH$_2$)$_{p-1}$COOCH$_3$ or a lactone of formula:

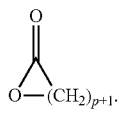

General procedures for carrying out electrochemical fluorination are described, for example, in U.S. Pat. No. 2,713,593 (Brice et al.) and International App. Pub. No. WO 98/50603, published Nov. 12, 1998. General procedures for carrying out direct fluorination are described, for example, in U.S. Pat. No. 5,488,142 (Fall et al.).

Some carboxylic acids and carboxylic acid fluorides useful for preparing compositions according to the present invention are commercially available. For example, carboxylic acids of formula CF$_3$—[O—CF$_2$]$_{1-3}$C(O)OH are available, for example, from Anles Ltd., St. Petersburg, Russia, and acid fluorides of formulas C$_2$F$_5$—O—(CF$_2$)$_2$—C(O)F, C$_3$F$_7$—O—(CF$_2$)$_2$—C(O)F, and CF$_3$CF$_2$—O—CF$_2$CF$_2$—O—CF$_2$C(O)F are available, for example, from Exfluor, Round Rock, Tex.

Divalent units of Formula I can be prepared, for example, by reaction of a partially or fully fluorinated carboxylic acid or salt thereof, an acid fluoride thereof, or a carboxylic acid ester (e.g., Rf—C(O)—OCH$_3$) using a variety of conventional methods to prepare compounds with polymerizable double bonds, for example, having formula Rf-Q-X—C(R)=CH$_2$, which can then be reacted, for example, under free-radical conditions. For example, a compound of formula Rf—(CO)NHCH$_2$CH$_2$O(CO)C(R)=CH$_2$ can be prepared by first reacting Rf—C(O)—OCH$_3$, for example, with ethanolamine to prepare alcohol-terminated Rf—(CO)NHCH$_2$CH$_2$OH, which can then be reacted with methacrylic acid, methacrylic anhydride, acrylic acid or acryloyl chloride to prepare the compound of formula Rf—(CO)NHCH$_2$CH$_2$O(CO)C(R)=CH$_2$, wherein R is methyl or hydrogen, respectively. Other amino alcohols (e.g., amino alcohols of formula NR$^1$HXOH) can be used in this reaction sequence to provide compounds of formula Rf-Q-X—C(R)=CH$_2$, wherein Q is —C(O)—N(R$^1$)—, X is alkylene or arylalkylene terminated by —O—C(O)— and optionally interrupted by at least one ether linkage (i.e., —O—), and R$^1$ and R are as defined above. In another example, Rf—C(O)—OCH$_3$ can be reacted with allyl amine or N-allyl aniline to prepare a compound of formula Rf—(CO)NHCH$_2$—CH=CH$_2$ or Rf—(CO)NH—C$_6$H$_4$—CH$_2$CH$_2$=CH$_2$, respectively. Similarly, Rf—C(O)—OCH$_3$ can be reacted, for example, with allyl alcohol to provide a compound of formula Rf—(CO)OCH$_2$CH=CH$_2$. In further examples, an ester of formula Rf—C(O)—OCH$_3$ or a carboxylic acid of formula Rf—C(O)—OH can be reduced using conventional methods (e.g., hydride, such as sodium borohydride, reduction) to an alcohol of formula Rf—CH$_2$OH. The alcohol of formula Rf—CH$_2$OH can then be reacted with methacryloyl chloride, for example, to provide a compound of formula Rf—CH$_2$O(CO)C(R)=CH$_2$. The alcohol of formula Rf—CH$_2$OH can also be reacted with allyl bromide, for example, to provide a compound of formula Rf—CH$_2$OCH$_2$CH=CH$_2$. Examples of suitable reactions and reactants are further disclosed, for example, in the European patent EP 870 778 A1, published Oct. 14, 1998, and U.S. Pat. No. 3,553,179 (Bartlett et al.), the disclosures of which are incorporated herein by reference.

In some embodiments, fluoroether compounds useful for practicing the present disclosure further comprise at least one (e.g., at least 1, 2, 5, 10, 15, 20, 25, or even at least 50) divalent unit represented by Formula XI:

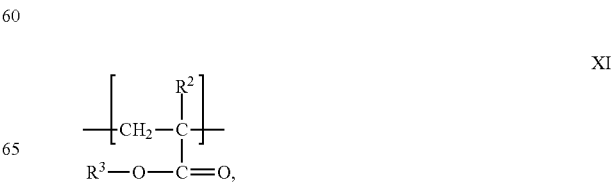

wherein each $R^2$ is independently hydrogen or alkyl having from 1 to 4 carbon atoms (e.g., methyl, ethyl, n-propyl, isopropyl, n-butyl, isobutyl, or sec-butyl), and wherein each $R^3$ is independently alkyl having from 1 to 30 (in some embodiments, 1 to 25, 1 to 20, 1 to 10, 4 to 25, 8 to 25, or even 12 to 25) carbon atoms. In some embodiments, each $R^2$ is independently hydrogen or methyl. In some embodiments, $R^3$ is hexadecyl or octadecyl. In some of these embodiments, the fluoroether compound is preparable by copolymerization of at least one compound represented by formula:

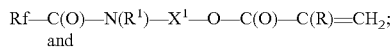
and at least one compound represented by formula:

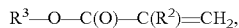

wherein $X^1$ is independently alkylene or arylalkylene, and wherein alkylene and arylalkylene are each optionally interrupted by at least one ether linkage (i.e., —O—).

Compounds of formula $R^3$—O—C(O)—C($R^2$)=CH$_2$, (e.g., methyl methacrylate, butyl acrylate, hexadecyl methacrylate, octadecyl methacrylate, stearyl acrylate, behenyl methacrylate) are available, for example, from several chemical suppliers (e.g., Sigma-Aldrich Company, St. Louis, Mo.; VWR International, West Chester, Pa.; Monomer-Polymer & Dajac Labs, Festerville, Pa.; Avocado Organics, Ward Hill, Mass.; and Ciba Specialty Chemicals, Basel, Switzerland) or may be synthesized by conventional methods. Some compounds of formula $R^3$—O—C(O)—C($R^2$)=CH$_2$ are available as single isomers (e.g., straight-chain isomer) of single compounds. Other compounds of formula $R^3$—O—C(O)—C($R^2$)=CH$_2$ are available, for example, as mixtures of isomers (e.g., straight-chain and branched isomers), mixtures of compounds (e.g., hexadecyl acrylate and octadecylacrylate), and combinations thereof.

In some embodiments, fluoroether compounds useful for practicing the present disclosure further comprise a polyalkyleneoxy segment. In some of these embodiments, the compositions comprise at least one (e.g., at least 1, 2, 5, 10, 15, 20, or even at least 25) ether-containing divalent unit represented by formula:

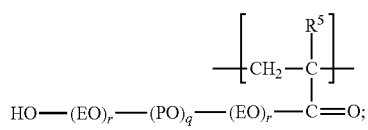  XII

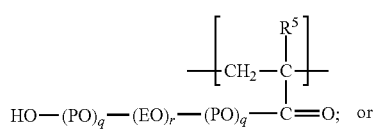  XIII

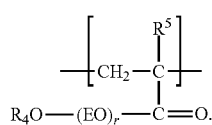  XIV wherein $R^4$ and $R^5$ are each independently hydrogen or alkyl of 1 to 4 carbon atoms (e.g., methyl, ethyl, n-propyl, isopropyl, butyl, isobutyl, or t-butyl);
EO represents —CH$_2$CH$_2$O—;
each PO independently represents —CH(CH$_3$)CH$_2$O— or —CH$_2$CH(CH$_3$)O—;

each r is independently an value from 1 to 128 (in some embodiments, from 7 to about 128, or even from 14 to about 128); and each q is independently an value from 0 to 55 (in some embodiments, from about 21 to about 54 or from about 9 to about 25).

In some embodiments, $R^4$ and $R^5$ are each independently hydrogen or methyl. In some embodiments, the fluoroether compound is preparable by copolymerization of at least one compound represented by formula:

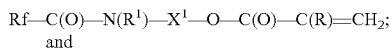
and at least one compound represented by formula:

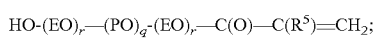

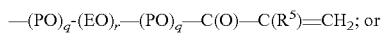 or

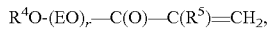

wherein $X^1$ is independently alkylene or arylalkylene, and wherein alkylene and arylalkylene are each optionally interrupted by at least one ether linkage (i.e., —O—). In some embodiments, the ether-containing divalent unit is represented by formula:

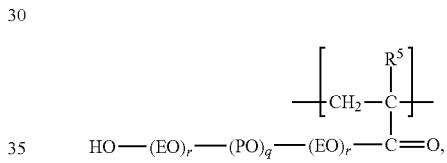

wherein r is an value from 5 to 15 (in some embodiments, from 9 to 13 or even 11), and wherein q is an value from 15 to 25 (in some embodiments, 19 to 23 or even 21).

Compounds of formulas HO-(EO)$_r$—(PO)$_q$-(EO)$_r$—C(O)—C($R^5$)=CH$_2$, HO—(PO)$_q$-(EO)$_r$—(PO)$_q$—C(O)—C($R^5$)=CH$_2$, or $R^4$O-(EO)$_r$—C(O)—C($R^5$)=CH$_2$ can be prepared by known methods, for example, combining acryloyl chloride with a polyethylene glycol having a molecular weight of about 200 to 10,000 grams per mole (e.g., those available from Union Carbide, a wholly owned subsidiary of Dow Chemical, Midland, Mich., under the trade designation-"CARBOWAX") or a block copolymer of ethylene oxide and propylene oxide having a molecular weight of about 500 to 15000 grams per mole (e.g., those available from BASF Corporation, Ludwigshafen, Germany, under the trade designation "PLURONIC"). When a diol-functional copolymer of ethylene oxide and propylene oxide is used, difunctional acrylates (e.g., represented by formula CH$_2$=C($R^5$)—C(O)—O-(EO)$_r$—(PO)$_q$-(EO)$_r$—C(O)—C($R^5$)=CH$_2$ or CH$_2$=C($R^5$)—C(O)—O—(PO)$_q$-(EO)$_r$—(PO)$_q$—C(O)—C($R^5$)=CH$_2$, wherein r, q, $R^5$, EO, and PO are as defined above) can be prepared and can be used in a copolymerization reaction with a compound having formula Rf-Q-X—C(R)=CH$_2$ or Rf—C(O)—N($R^1$)—X$^1$—O—C(O)—C(R)=CH$_2$.

In some embodiments wherein fluoroether compounds disclosed herein comprise a polyalkyleneoxy segment, the polyalkyleneoxy segment may be present in units represented by formula:

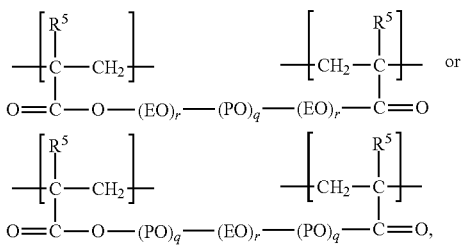

wherein r, q, $R^5$, EO, and PO are as defined in any above embodiments.

In some embodiments wherein fluoroether compounds disclosed herein comprise a polyalkyleneoxy segment, the polyalkyleneoxy segment may be a sulfur-terminated segment (e.g., —S(O)$_{0-2}$—C$_s$H$_{2s}$—C(O)—O-(EO)$_r$—C(O)—C$_s$H$_{2s}$—S(O)$_{0-2}$—, —S(O)$_{0-2}$—C$_s$H$_{2s}$—C(O)—O-(EO)$_r$(PO)$_q$(EO)$_r$—C(O)—C$_s$H$_{2s}$—S(O)$_{0-2}$—, or —S(O)$_{0-2}$—C$_s$H$_{2s}$—C(O)—O—(PO)$_q$(EO)$_r$(PO)$_q$C(O)—C$_s$H$_{2s}$—S(O)$_{0-2}$—, wherein r, q, EO, and PO are as defined above and s is an integer from 1 to 5, or in some embodiments, 2 to 3). Sulfur-terminated segments can be incorporated into the compositions by copolymerization of a difunctional mercaptan, which can react with fluorinated acrylates (e.g., Rf-Q-X—C(R)=CH$_2$ or Rf—C(O)—N(R$^1$)—X$^1$—O—C(O)—C(R)=CH$_2$) under free-radical polymerization conditions to provide block copolymers. Examples of difunctional mercaptans include HS—C$_s$H$_{2s}$—C(O)—O-(EO)$_r$—C(O)—C$_s$H$_{2s}$—SH, HS—C$_s$H$_{2s}$—C(O)—O-(EO)$_r$(PO)$_q$(EO)$_r$—C(O)—C$_s$H$_{2s}$—SH, or HS—C$_s$H$_{2s}$—C(O)—O—(PO)$_q$-(EO)$_r$—(PO)$_q$C(O)—C$_s$H$_{2s}$—SH, wherein r, q, EO, and PO are as defined above and s is an integer from 1 to 5, or in some embodiments, 2 to 3. The resulting polymer or oligomer can then optionally be oxidized using conventional techniques. Difunctional mercaptans can be prepared, for example, by reaction of a diol-functional polyethylene glycol or a block copolymer of ethylene oxide and propylene oxide with, for example, mercaptoacetic acid or mercaptopropionic acid. In other embodiments, polyalkyleneoxy-containing diacrylates can be treated with H$_2$S or other sulfhydryl-containing compounds according to the methods of U.S. Pat. No. 3,278,352 (Erickson), incorporated herein by reference, to provide mercaptan-terminated polyalkyleneoxy compounds.

In some embodiments wherein fluoroether compounds useful for practicing the present disclosure comprise a polyalkyleneoxy segment, the composition is preparable by copolymerization of at least one compound represented by formula:

Rf-Q-X—C(R)=CH$_2$; and at least one compound represented by formula:

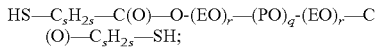

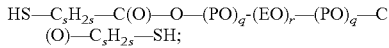

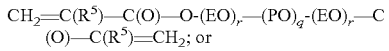

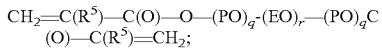

wherein s, r, q, $R^5$, EO, and PO are as defined in any of the embodiments above.

In some embodiments, fluoroether compounds useful for practicing the present disclosure further comprise at least one (e.g., at least 1, 2, 5, 10, 15, 20, or even at least 25) anionic divalent unit represented by formula:

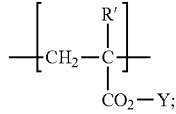

XV

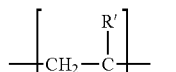

XVI

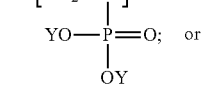

XVII

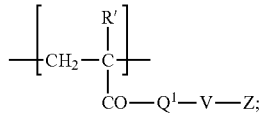

wherein $Q^1$ is —O—, —S—, or —N(R$^1$)— (in some embodiments, —O—);

R' and R$^1$ are each independently hydrogen or alkyl having from 1 to 4 carbon atoms (e.g., methyl, ethyl, n-propyl, isopropyl, butyl, isobutyl, or t-butyl);

V is alkylene that is optionally interrupted by at least one ether linkage (i.e., —O—) or amine linkage (i.e., —N(R$^1$)—);

each Y is independently selected from the group consisting of hydrogen, a counter cation, and a bond to the hydrocarbon-bearing formation; and Z is selected from the group consisting of —P(O)(OY)$_2$, —O—P(O)(OY)$_{0-2}$, —SO$_3$Y, and CO$_2$Y.

In some embodiments, R' and R$^1$ are each independently hydrogen or methyl. In some embodiments, V is alkylene having from 2 to 4 (in some embodiments, 2) carbon atoms. In some embodiments, Y is hydrogen. In some embodiments, Y is a counter cation. Exemplary Y counter cations include alkali metal (e.g., sodium, potassium, and lithium), ammonium, alkyl ammonium (e.g., tetraalkylammonium), and five to seven membered heterocyclic groups having a positively charged nitrogen atom (e.g, a pyrrolium ion, pyrazolium ion, pyrrolidinium ion, imidazolium ion, triazolium ion, isoxazolium ion, oxazolium ion, thiazolium ion, isothiazolium ion, oxadiazolium ion, oxatriazolium ion, dioxazolium ion, oxathiazolium ion, pyridinium ion, pyridazinium ion, pyrimidinium ion, pyrazinium ion, piperazinium ion, triazinium ion, oxazinium ion, piperidinium ion, oxathiazinium ion, oxadiazinium ion, and morpholinium ion). In some embodiments, for example, embodiments of treated hydrocarbon-bearing formations, Y is a bond to the hydrocarbon-bearing formation.

Divalent units of Formulas XV, XVI, and XVII can be incorporated into the fluoroether compounds disclosed herein by copolymerization of a compound of formula Rf-Q-X—C(R)=CH$_2$ with a compound of formula YOOC—C(R')=CH$_2$, (YO)$_2$(O)P—C(R')=CH$_2$, and Z—V-Q$^1$C(O)—C(R')=CH$_2$, respectively. Useful compounds of these formulas include acrylic acid, methacrylic acid, β-carboxyethyl acrylate, β-carboxyethyl methacryate, vinyl phosphonic acid, ethylene glycol methacrylate phosphate, and 2-acrylamido-2-methyl-1-propane sulfonic acid (AMPS).

In some embodiments, fluoroether compounds useful for practicing the present disclosure further comprise at least one (e.g., at least 1, 2, 5, 10, 15, 20, or even at least 25) divalent unit represented by formula:

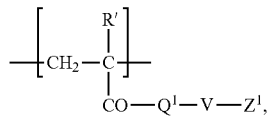

XVIII wherein
$Q^1$ is selected from the group consisting of —O—, —S—, and —N($R^1$)— (in some embodiments, —O—);
R' and $R^1$ are each independently selected from the group consisting of hydrogen and alkyl having from 1 to 4 carbon atoms (e.g., methyl, ethyl, n-propyl, isopropyl, butyl, isobutyl, or t-butyl);
V is alkylene that is optionally interrupted by at least one ether linkage (i.e., —O—) or amine linkage (i.e., —N($R^1$)—) (in some embodiments, alkylene having from 2 to 4 or even 2 carbon atoms); and
$Z^1$ is selected from the group consisting of —[N($R^8$)$_3$]$^+$M$^-$, —N$^+$(OY$^1$)($R^9$)$_3$, —N$^+$($R^8$)$_2$—(CH$_2$)$_g$—SO$_3$Y$^1$, and —N$^+$($R^8$)$_2$—(CH$_2$)$_g$—CO$_2$Y$^1$, wherein
each $R^8$ is independently selected from the group consisting of hydrogen and alkyl having from 1 to 6 carbon atoms (e.g., methyl, ethyl, n-propyl, isopropyl, butyl, isobutyl, t-butyl, n-pentyl, isopentyl, n-hexyl);
each $R^9$ is independently selected from the group consisting of hydrogen and alkyl having from 1 to 6 carbon atoms (e.g., methyl, ethyl, n-propyl, isopropyl, butyl, isobutyl, t-butyl, n-pentyl, isopentyl, n-hexyl), wherein alkyl is optionally substituted by at least one halogen, alkoxy, nitro, or nitrile group, or two $R^9$ groups may join to form a 5 to 7-membered ring optionally containing at least one O, N, or S and optionally substituted by alkyl having 1 to 6 carbon atoms;
each g is independently an integer from 1 to 6 (i.e., 1, 2, 3, 4, 5, or 6);
M$^-$ is a counter anion (e.g., acetate, chloride, iodide, and methylsulphate); and
$Y^1$ is selected from the group consisting of hydrogen and free anion. In some embodiments, R' and $R^1$ are each independently hydrogen or methyl. In some embodiments of M–, the counter anion is present in the hydrocarbon-bearing formation.

Divalent units of Formula XVIII can be incorporated into the fluoroether compounds disclosed herein by copolymerization of a compound of formula Rf-Q-X—C(R)=CH$_2$ with a compound of formula $Z^1$—V-Q$^1$C(O)—C(R')=CH$_2$. Useful compounds for preparing compound of formula $Z^1$—V-Q$^1$C(O)—C(R')=CH$_2$ include aminoalkyl (meth)acrylates such as N,N-diethylaminoethylmethacrylate, N,N'-dimethylaminoethylmethacrylate and N-t-butylaminoethylmethacrylate, which are commercially available, for example, from Sigma-Aldrich and can be quaternized using conventional techniques, for example, by reaction with an alkyl halide (e.g., bromobutane, bromoheptane, bromodecane, bromododecane, or bromohexadecane) in a suitable solvent and optionally in the presence of a free-radical inhibitor to provide a compound wherein $Z^1$ is —[N($R^8$)$_3$]$^+$M$^-$. Useful compounds having formula $Z^1$—V-Q$^1$C(O)—C(R')=CH$_2$ include N,N-dimethylaminoethyl acrylate methyl chloride quaternary and N,N-dimethylaminoethyl methacrylate methyl chloride quaternary available from Ciba Specialty Chemicals, Basel, Switzerland, under the trade designations "CIBA AGEFLEX FA1Q80MC" and "CIBA AGEFLEX FM1Q75MC", respectively.

In some embodiments, fluoroether compounds useful for practicing the present disclosure further comprise at least one (e.g., at least 1, 2, 5, 10, 15, 20, or even at least 25) divalent unit represented by formula:

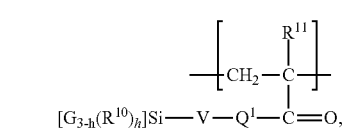

XIX wherein
each $R^{10}$ is independently selected from the group consisting of alkyl having from 1 to 6 carbon atoms (e.g., methyl, ethyl, n-propyl, isopropyl, butyl, isobutyl, t-butyl, n-pentyl, isopentyl, n-hexyl) and aryl (e.g., phenyl);
$Q^1$ is selected from the group consisting of —O—, —S—, and —N($R^1$)— (in some embodiments, —O—);
$R^1$ and $R^{11}$ are each independently selected from the group consisting of hydrogen and alkyl having from 1 to 4 carbon atoms (e.g., methyl, ethyl, n-propyl, isopropyl, butyl, isobutyl, or t-butyl);
V is alkylene that is optionally interrupted by at least one ether linkage (i.e., —O—) or amine linkage (i.e., —N($R^1$)—) (in some embodiments, alkylene having from 2 to 4 or even 2 carbon atoms);
each G is independently selected from the group consisting of hydroxyl, alkoxy, acyloxy, and halogen; and
h is 0, 1, or 2 (in some embodiments, 0).

In some embodiments, $R^1$ and $R^{11}$ are each independently hydrogen or methyl.

Divalent units of Formula XIX can be incorporated into the fluoroether compounds disclosed herein by copolymerization of a compound of formula Rf-Q-X—C(R)=CH$_2$ with a compound of formula [G$_{3-h}$(R$_{10}$)$_h$]—Si—V-Q$^1$C(O)—C(R$^{11}$)=CH$_2$ (e.g., CH$_2$=C(CH$_3$)C(O)OCH$_2$CH$_2$CH$_2$Si(OCH$_3$)$_3$ available, for example, from OSi Specialties, Greenwich, Conn. under the trade designation "SILQUEST A-174 SILANE").

The polymerization reaction of at least one compound of formula Rf-Q-X—C(R)=CH$_2$ and at least one second compound, for example, of formula $R^3$—O—C(O)—C($R^2$)=CH$_2$, HO-(EO)$_r$—(PO)$_q$-(EO)$_r$—C(O)—C($R^5$)=CH$_2$, HO—(PO)$_q$-(EO)$_r$—(PO)$_q$—C(O)—C($R^5$)=CH$_2$, $R^4$O-(EO)$_r$—C(O)—C($R^5$)=CH$_2$, YOOC—C(R')=CH$_2$, (YO)$_2$(O)P—C(R')=CH$_2$, Z—V-Q$^1$C(O)—C(R')=CH$_2$, or $Z^1$—V-Q$^1$C(O)—C(R')=CH$_2$ can be carried out in the presence of an added free-radical initiator. Free radical initiators such as those widely known and used in the art may be used to initiate polymerization of the components. Exemplary free-radical initiators are described in U.S. Pat. No. 6,664,354 (Savu et al.), the disclosure of which, relating to free-radical initiators, is incorporated herein by reference. In some embodiments, the polymer or oligomer that is formed is a random graft copolymer. In some embodiments, the polymer or oligomer that is formed is a block copolymer.

In some embodiments, the polymerization reaction is carried out in solvent. The components may be present in the reaction medium at any suitable concentration, (e.g., from about 5 percent to about 80 percent by weight based on the total weight of the reaction mixture). Illustrative examples of suitable solvents include aliphatic and alicyclic hydrocarbons (e.g., hexane, heptane, cyclohexane), aromatic solvents (e.g., benzene, toluene, xylene), ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone and methyl isobutyl ketone), halogenated solvents (e.g., methylchloroform, 1,1,2-trichloro-1,2,2-trifluoroethane, trichloroethylene, trifluorotoluene, and hydrofluoroethers available, for example, from 3M Company, St. Paul, Minn. under the trade designations "HFE-7100" and "HFE-7200"), and mixtures thereof.

Polymerization can be carried out at any temperature suitable for conducting an organic free-radical reaction. Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or even from about 50° C. to about 80° C.).

Free-radical polymerizations may be carried out in the presence of chain transfer agents. Typical chain transfer agents that may be used in the preparation compositions according to the present invention include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); poly(ethylene glycol)-substituted mercaptans; carboxy-substituted mercaptans (e.g., mercaptopropionic acid or mercaptoacetic acid): amino-substituted mercaptans (e.g., 2-mercaptoethylamine); difunctional mercaptans (e.g., di(2-mercaptoethyl) sulfide); silane-substituted mercaptans (e.g., 3-mercaptopropyltrimethoxysilane, available, for example, from Huls America, Inc., Somerset, N.J., under the trade designation "DYNASYLAN") and aliphatic mercaptans (e.g., octylmercaptan, dodecylmercaptan, and octadecylmercaptan).

Adjusting, for example, the concentration and activity of the initiator, the concentration of each of the reactive monomers, the temperature, the concentration of the chain transfer agent, and the solvent using techniques known in the art can control the molecular weight of a polyacrylate polymer or copolymer.

Fluoroether compounds useful for practicing the present disclosure may also be preparable by adding additional monomers to the polymerization reaction. For example, a compound formula HO—V—O—C(O)—C(R')=CH$_2$, wherein R' and V are as defined above may be used. Examples of these monomers include hydroxyethyl methacrylate. Other examples include vinylidene chloride, vinyl chloride, silicone acrylates available, for example, from Shin-Etsu Silicones of America, Inc., Akron, Ohio, under the trade designation "X22-2426", urethane acrylates available, for example, from Sartomer Company, Exton, Pa. under the trade designation "CN966J75", and fluorinated acrylates (e.g., 3,3,4,4,5,5,6,6,6-nonafluorohexyl acrylate from Daikin Chemical Sales, Osaka, Japan, 3,3,4,4,5,5,6,6,6-nonafluorohexyl 2-methylacrylate from Indofine Chemical Co., Hillsborough, N.J., and acrylates described in U.S. Pat. Nos. 2,803,615 (Albrecht et al.) and 6,664,354 (Savu et al.), the disclosures of which, relating to free-radically polymerizable monomers and methods of their preparation, are incorporated herein by reference).

In some embodiments, fluoroether compounds disclosed herein have weight average molecular weights in a range from 1000 grams per mole to 100,000 grams per mole. In some embodiments, the weight average molecular weight is at least 2000, 3000, 4000, 5000, 6000, 7000, 8000, 9000, or even 10000 grams per mole up to 30,000, 40,000, 50,000, 60,000, 70,000, 80,000, or even up to 90,000 grams per mole. Fluoroether compounds disclosed herein typically have a distribution of molecular weights and compositions. Weight average molecular weights can be measured, for example, by gel permeation chromatography (i.e., size exclusion chromatography) using techniques known to one of skill in the art.

Typically, in treatment compositions useful for practicing the methods described herein, the fluoroether compound is present in the treatment composition at at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight, based on the total weight of the treatment composition. For example, the amount of the fluoroether compound in the treatment compositions may be in a range of from 0.01 to 10, 0.1 to 10, 0.1 to 5, 1 to 10, 0.5 to 2, or even in a range from 1 to 5 percent by weight, based on the total weight of the treatment composition. Lower and higher amounts of the fluoroether compound in the treatment compositions may also be used, and may be desirable for some applications.

Treatment compositions useful for practicing the methods disclosed herein comprise at least one of solvent. Examples of useful solvents for any of these methods include organic solvents, water, easily gasified fluids (e.g., ammonia, low molecular weight hydrocarbons, and supercritical or liquid carbon dioxide), and combinations thereof. In some embodiments, the compositions are essentially free of water (i.e., contains less than 0.1 percent by weight of water based on the total weight of the composition). In some embodiments, the solvent is a water-miscible solvent (i.e., the solvent is soluble in water in all proportions). Examples of organic solvents include polar and/or water-miscible solvents, for example, monohydroxy alcohols having from 1 to 4 or more carbon atoms (e.g., methanol, ethanol, isopropanol, propanol, or butanol); polyols such as glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, dipropylene glycol, or poly(propylene glycol)), triols (e.g., glycerol, trimethylolpropane), or pentaerythritol; ethers such as diethyl ether, methyl t-butyl ether, tetrahydrofuran, p-dioxane, or polyol ethers (e.g., glycol ethers (e.g., ethylene glycol monobutyl ether, diethylene glycol monomethyl ether, dipropylene glycol monomethyl ether, propylene glycol monomethyl ether, 2-butoxyethanol, or those glycol ethers available under the trade designation "DOWANOL" from Dow Chemical Co., Midland, Mich.)); ketones (e.g., acetone or 2-butanone); and combinations thereof.

In some embodiments of the methods disclosed herein, the solvent comprises at least one of a polyol or polyol ether independently having from 2 to 25 (in some embodiments, 2 to 15, 2 to 10, 2 to 9, or 2 to 8) carbon atoms. In some embodiments, the solvent comprises a polyol. The term "polyol" refers to an organic molecule consisting of C, H, and O atoms connected one to another by C—H, C—C, C—O, O—H single bonds, and having at least two C—O—H groups. In some embodiments, useful polyols have 2 to 25, 2 to 20, 2 to 15, 2 to 10, 2 to 8, or 2 to 6 carbon atoms. In some embodiments, the solvent comprises a polyol ether. The term "polyol ether" refers to an organic molecule consisting of C, H, and O atoms connected one to another by C—H, C—C, C—O, O—H single bonds, and which is at least theoretically derivable by at least partial etherification of a polyol. In some embodiments, the polyol ether has at least one C—O—H group and at least one C—O—C linkage. Useful polyol ethers may have from 3 to 25 carbon atoms, 3 to 20, 3 to 15, 3 to 10, 3 to 8, or from 5 to 8 carbon atoms. In some embodiments, the polyol is at least one of ethylene glycol, propylene glycol, poly(propylene glycol), 1,3-propanediol, or 1,8-octanediol, and the polyol ether is at least one of 2-butoxyethanol, diethylene glycol monomethyl ether, ethylene glycol monobutyl ether, dipropylene glycol monomethyl ether, or 1-methoxy-2-propanol. In some embodiments, the polyol and/or polyol ether has a normal boiling point of less than 450° F. (232° C.), which may be useful, for example, to facilitate removal of the polyol and/or polyol ether from a well after treatment. In some embodiments, the solvent comprises at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether.

In some embodiments of the methods disclosed herein, the solvent comprises at least one of water, a monohydroxy alcohol, an ether, or a ketone, wherein the monohydroxy alcohol, the ether, and the ketone each independently have up to 4 carbon atoms. Exemplary monohydroxy alcohols having from 1 to 4 carbon atoms include methanol, ethanol, n-propanol, isopropanol, 1-butanol, 2-butanol, isobutanol, and t-butanol. Exemplary ethers having from 2 to 4 carbon atoms include diethyl ether, ethylene glycol methyl ether, tetrahydrofuran, p-dioxane, and ethylene glycol dimethyl ether. Exemplary ketones having from 3 to 4 carbon atoms include acetone, 1-methoxy-2-propanone, and 2-butanone. In some embodiments, useful solvents for practicing the methods disclosed herein comprise at least one of methanol, ethanol, isopropanol, tetrahydrofuran, or acetone.

In some embodiments of the methods disclosed herein, the treatment compositions comprise at least two organic solvents. In some embodiments, the solvent comprises at least one of a polyol or polyol ether independently having from 2 to 25 (in some embodiments, 2 to 15, 2 to 10, 2 to 9, or 2 to 8) carbon atoms and at least one of water, a monohydroxy alcohol, an ether, or a ketone, wherein the monohydroxy alcohol, the ether, and the ketone each independently have up to 4 carbon atoms. In these embodiments, in the event that a component of the solvent is a member of two functional classes, it may be used as either class but not both. For example, ethylene glycol monomethyl ether may be a polyol ether or a monohydroxy alcohol, but not as both simultaneously. In these embodiments, each solvent component may be present as a single component or a mixture of components. In some embodiments, treatment compositions useful for practicing any of the methods disclosed herein comprise at least one of a polyol or polyol ether independently having from 2 to 25 (in some embodiments, 2 to 15, 2 to 10, 2 to 9, or 2 to 8) carbon atoms and at least one monohydroxy alcohol having up to 4 carbon atoms.

For any of the embodiments of the methods disclosed herein, wherein the treatment compositions comprise at least one of a polyol or polyol ether independently having from 2 to 25 (in some embodiments, 2 to 15, 2 to 10, 2 to 9, or 2 to 8) carbon atoms, the polyol or polyol ether is present in the composition at at least 50, 55, 60, or 65 percent by weight and up to 75, 80, 85, or 90 percent by weight, based on the total weight of the composition. Exemplary solvent combinations that contain at least one of a polyol or polyol ether include 1,3-propanediol (80%)/isopropanol (IPA) (20%), propylene glycol (70%)/IPA (30%), propylene glycol (90%)/IPA (10%), propylene glycol (80%)/IPA (20%), ethylene glycol (50%)/ethanol (50%), ethylene glycol (70%)/ethanol (30%), propylene glycol monobutyl ether (PGBE) (50%)/ethanol (50%), PGBE (70%)/ethanol (30%), dipropylene glycol monomethyl ether (DPGME) (50%)/ethanol (50%), DPGME (70%)/ethanol (30%), diethylene glycol monomethyl ether (DEGME) (70%)/ethanol (30%), triethylene glycol monomethyl ether (TEGME) (50%)/ethanol (50%), TEGME (70%)/ethanol (30%), 1,8-octanediol (50%)/ethanol (50%), propylene glycol (70%)/tetrahydrofuran (THF) (30%), propylene glycol (70%)/acetone (30%), propylene glycol (70%), methanol (30%), propylene glycol (60%)/IPA (40%), 2-butoxyethanol (80%)/ethanol (20%), 2-butoxyethanol (70%)/ethanol (30%), 2-butoxyethanol (60%)/ethanol (40%), propylene glycol (70%)/ethanol (30%), ethylene glycol (70%)/IPA (30%), and glycerol (70%)/IPA (30%), wherein the exemplary percentages are by weight are based on the total weight of solvent. In some embodiments of the methods disclosed herein, the solvent comprises up to 95, 90, 80, 70, 60, 50, 40, 30, 20, or 10 percent by weight of a monohydroxy alcohol having up to 4 carbon atoms, based on the total weight of the composition.

The amount of solvent typically varies inversely with the amount of other components in treatment compositions useful for practicing the present disclosure. For example, based on the total weight of the composition the solvent may be present in the composition in an amount of from at least 10, 20, 30, 40, or 50 percent by weight or more up to 60, 70, 80, 90, 95, 98, or 99 percent by weight, or more.

The ingredients for treatment compositions described herein including fluoroether compounds and solvent can be combined using techniques known in the art for combining these types of materials, including using conventional magnetic stir bars or mechanical mixer (e.g., in-line static mixer and recirculating pump).

Although not wishing to be bound by theory, it is believed that treatment methods according to the present disclosure will provide more desirable results when the treatment composition is homogenous at the temperature(s) encountered in the hydrocarbon-bearing formation. Whether the treatment composition is homogeneous at the temperature can depend on many variables (e.g., concentration of the fluorinated polymer, solvent composition, brine concentration and composition, hydrocarbon concentration and composition, and the presence of other components (e.g., surfactants)). It is believed that once the treatment composition contacts a hydrocarbon-bearing formation (e.g., downhole), the environment will cause the fluoroether compound to become less soluble in the composition and adsorb onto at least one of the formation or at least a portion of a plurality of proppants located in a fracture in the formation. Once adsorbed onto the formation or at least a portion of a plurality of proppants, the fluoroether compound can modify the wetting properties of the formation and cause an increase in at least one of the gas or oil permeabilities in the formation. It is believed that low-foaming fluorinated polymers and compositions are more effective for increasing the gas permeability of hydrocarbon-bearing formations.

In some embodiments of methods and treated hydrocarbon-bearing formations disclosed herein, the hydrocarbon-bearing formation has brine. The brine present in the formation may be from a variety of sources including at least one of connate water, flowing water, mobile water, immobile water, residual water from a fracturing operation or from other downhole fluids, or crossflow water (e.g., water from adjacent perforated formations or adjacent layers in the formations). The brine may cause water blocking in the hydrocarbon-bearing formation before treatment. In some embodiments of the treatment compositions, the solvent at least partially solubilizes or at least partially displaces brine in the hydrocarbon-bearing formation. In some embodiments, the brine has at least 2, 3, 4, 5, 6, 7, 8, 9, or even at least 10 weight percent dissolved salts (e.g., sodium chloride, calcium chloride, strontium chloride, magnesium chloride, potassium chloride, ferric chloride, ferrous chloride, and hydrates thereof), based on the total weight of the brine. Although not wanting to be bound by theory, it is believed that the effectiveness of the methods disclosed herein for improving hydrocarbon productivity of a particular oil and/or gas well having brine accumulated in the near wellbore region will typically be determined by the ability of the treatment composition to dissolve or displace the quantity of brine present in the near wellbore region of the well without causing precipitation of the fluoroether compound or salts. Hence, at a given temperature greater amounts of treatment compositions having lower brine solubility (i.e., treatment compositions that can dissolve a relatively lower amount of brine) will typically be needed than in the case of treatment compositions having higher brine solubility and containing the same fluoroether compound at the same concentration.

In some embodiments of the methods disclosed herein, when the treatment composition treats the hydrocarbon-bearing formation, the hydrocarbon-bearing formation is substantially free of precipitated salt. As used herein, the term "substantially free of precipitated salt" refers to an amount of salt that does not interfere with the ability of the fluorinated ether compostion to increase the gas permeability of the hydrocarbon-bearing formation. In some embodiments, "substantially free of precipitated salt" means that no precipitate is visually observed. In some embodiments, "substantially free of precipitated salt" is an amount of salt that is less than 5% by weight higher than the solubility product at a given temperature and pressure.

In some embodiments of methods according to the present disclosure, combining the treatment composition and the brine of the hydrocarbon-bearing formation at the temperature of the hydrocarbon-bearing formation does not result in the precipitation of the fluoroether compound. Phase behavior can be evaluated before treating the hydrocarbon-bearing formation with the treatment composition by obtaining a sample of the brine from the hydrocarbon-bearing formation and/or analyzing the composition of the brine from the hydrocarbon-bearing formation and preparing an equivalent brine having the same or similar composition to the composition of the brine in the formation. The brine saturation level in a hydrocarbon-bearing formation can be determined using methods known in the art and can be used to determined the amount of brine that can be mixed with the treatment composition. The brine and the treatment composition are combined (e.g., in a container) at the temperature and then mixed together (e.g., by shaking or stirring). The mixture is then maintained at the temperature for 15 minutes, removed from the heat, and immediately visually evaluated to see if cloudiness or precipitation occurs. In some embodiments, the amount of brine that is added before cloudiness or precipitation occurs is at least 5, 10, 15, 20, 25, 30, 35, 40, 45, or at least 50% by weight, based on the total weight of brine and treatment composition combined in the phase behavior evaluation.

The phase behavior of the treatment composition and the brine can be evaluated over an extended period of time (e.g., 1 hour, 12 hours, 24 hours, or longer) to determine if any precipitation or cloudiness is observed. By adjusting the relative amounts of brine (e.g., equivalent brine) and the treatment composition, it is possible to determine the maximum brine uptake capacity (above which precipitation or cloudiness occurs) of the treatment composition at a given temperature. Varying the temperature at which the above procedure is carried out typically results in a more complete understanding of the suitability of treatment compositions for a given well.

In some embodiments of the methods disclosed herein, the hydrocarbon-bearing formation has both liquid hydrocarbons and gas, and the hydrocarbon-bearing formation has at least a gas permeability that is increased after the hydrocarbon-bearing formation is treated with the treatment composition. In some embodiments, the gas permeability after treating the hydrocarbon-bearing formation with the treatment composition is increased by at least 5 percent (in some embodiments, by at least 10, 15, 20, 30, 40, 50, 60, 70, 80, 90, or 100 percent or more) relative to the gas permeability of the formation before treating the formation. In some embodiments, the gas permeability is a gas relative permeability. In some embodiments, the liquid (e.g., oil or condensate) permeability in the hydrocarbon-bearing formation is also increased (in some embodiments, by at least 5, 10, 15, 20, 30, 40, 50, 60, 70, 80, 90, or 100 percent or more) after treating the formation.

In some embodiments, the increase in gas permeability of the treated hydrocarbon-bearing formation is higher than an increase in gas permeability obtained when an equivalent hydrocarbon-bearing formation is treated with the solvent. The term "equivalent hydrocarbon-bearing formation" refers to a hydrocarbon-bearing formation that is similar to or the same (e.g., in chemical make-up, surface chemistry, brine composition, and hydrocarbon composition) as a hydrocarbon-bearing formation disclosed herein before it is treated with a method according to the present disclosure. In some embodiments, both the hydrocarbon-bearing formation and the equivalent hydrocarbon-bearing formation are siliciclastic formations, in some embodiments, greater than 50 percent sandstone. In some embodiments, the hydrocarbon-bearing formation and the equivalent hydrocarbon-bearing formation may have the same or similar pore volume and porosity (e.g., within 15 percent, 10 percent, 8 percent, 6 percent, or even within 5 percent).

The hydrocarbon-bearing formation having both gas and liquid hydrocarbons may have gas condensate, black oil, or volatile oil and may comprise, for example, at least one of methane, ethane, propane, butane, pentane, hexane, heptane, octane, nonane, decane, or higher hydrocarbons. The term "black oil" refers to the class of crude oil typically having gas-oil ratios (GOR) less than about 2000 scf/stb (356 $m^3/m^3$). For example, a black oil may have a GOR in a range from about 100 (18), 200 (36), 300 (53), 400 (71), or even 500 scf/stb (89 $m^3/m^3$) up to about 1800 (320), 1900 (338), or 2000 scf/stb (356 $m^3/m^3$). The term "volatile oil" refers to the class of crude oil typically having a GOR in a range between about 2000 and 3300 scf/stb (356 and 588 $m^3/m^3$). For example, a volatile oil may have a GOR in a range from about 2000 (356), 2100 (374), or 2200 scf/stb (392 $m^3/m^3$) up to about 3100 (552), 3200 (570), or 3300 scf/stb (588 $m^3/m^3$). In some embodiments, the treatment composition at least partially solubilizes or at least partially displaces the liquid hydrocarbons in the hydrocarbon-bearing formation.

Generally, for the treatment methods disclosed herein, the amounts of the fluoroether compound and solvent (and type of solvent) is dependent on the particular application since conditions typically vary between wells, at different depths of individual wells, and even over time at a given location in an individual well. Advantageously, treatment methods according to the present disclosure can be customized for individual wells and conditions. For example, a method of making a treatment composition useful for practicing the methods disclosed herein may include receiving (e.g., obtaining or measuring) data comprising the temperature and at least one of the hydrocarbon composition or the brine composition (including the brine saturation level and components of the brine) of a selected geological zone of a hydrocarbon-bearing formation. These data can be obtained or measured using techniques well known to one of skill in the art. A formulation may then be generated based at least in part on compatibility information concerning the fluoroether compound, the solvent, the temperature, and at least one of the hydrocarbon composition or brine composition of the selected geological zone of the formation. In some embodiments, the compatibility information comprises information concerning phase stability of a mixture of the fluoroether compound, the solvent, and a model brine composition, wherein the model brine composition is based at least partially on the brine composition of the geological zone of the formation. The phase stability of a solution or dispersion can be evaluated using the phase behavior evaluation described above. The phase behavior can be evaluated over an extended period of time (e.g., 1 hour, 12 hours, 24 hours, or longer) to determine if any precipitation or cloudiness is observed. In some embodiments, the compatibility information comprises information concerning solid (e.g., salts or asphaltenes) precipitation from a mixture of the fluoroether compound, the solvent, a model brine composition, and a model hydrocarbon composition, wherein the model brine composition is based at least partially on the brine composition of the geological zone of the formation, and wherein the model hydrocarbon composition is based at least partially on the hydrocarbon composition of the geological zone of the formation. In addition to using a phase behavior evaluation, it is also contemplated that one may be able obtain the compatibility information, in whole or in part, by computer simulation or by referring to previously determined, collected, and/or tabulated information (e.g., in a handbook or a computer database).

The hydrocarbon-bearing formations that may be treated according to the present disclosure may be siliciclastic (e.g., shale, conglomerate, diatomite, sand, and sandstone) or carbonate (e.g., limestone or dolomite) formations. In some embodiments, the hydrocarbon-bearing formation is predominantly sandstone (i.e., at least 50 percent by weight sandstone). In some embodiments, the hydrocarbon-bearing formation is predominantly limestone (i.e., at least 50 percent by weight limestone).

Methods according to the present disclosure may be practiced, for example, in a laboratory environment (e.g., on a core sample (i.e., a portion) of a hydrocarbon-bearing formation or in the field (e.g., on a subterranean hydrocarbon-bearing formation situated downhole). Typically, the methods disclosed herein are applicable to downhole conditions having a pressure in a range from about 1 bar (100 kPa) to about 1000 bars (100 MPa) and have a temperature in a range from about 100° F. (37.8° C.) to 400° F. (204° C.) although the methods are not limited to hydrocarbon-bearing formations having these conditions. Those skilled in the art, after reviewing the instant disclosure, will recognize that various factors may be taken into account in practice of the any of the disclosed methods including the ionic strength of the brine, pH (e.g., a range from a pH of about 4 to about 10), and the radial stress at the wellbore (e.g., about 1 bar (100 kPa) to about 1000 bars (100 MPa)).

In the field, treating a hydrocarbon-bearing formation with a treatment composition described herein can be carried out using methods (e.g., by pumping under pressure) well known to those skilled in the oil and gas art. Coil tubing, for example, may be used to deliver the treatment composition to a particular geological zone of a hydrocarbon-bearing formation.

In some embodiments of practicing the methods described herein it may be desirable to isolate a geological zone (e.g., with conventional packers) to be treated with the composition.

Methods according to the present disclosure are useful, for example on both existing and new wells. Typically, it is believed to be desirable to allow for a shut-in time after compositions described herein are treated with the hydrocarbon-bearing formations. Exemplary shut-in times include a few hours (e.g., 1 to 12 hours), about 24 hours, or even a few (e.g., 2 to 10) days. After the treatment composition has been allowed to remain in place for the desired time, the solvent present in the composition may be recovered from the formation by simply pumping fluids up tubing in a well as is commonly done to produce fluids from a formation.

In some embodiments of methods according to the present disclosure, the method comprises treating the hydrocarbon-bearing formation with a fluid before treating the hydrocarbon-bearing formation with the composition. In some embodiments, the fluid at least one of at least partially solubilizes or at least partially displaces the brine in the hydrocarbon-bearing formation. In some embodiments, the fluid at least partially solubilizes the brine. In some embodiments, the fluid at least partially displaces the brine. In some embodiments, the fluid at least one of at least partially solubilizes or displaces liquid hydrocarbons in the hydrocarbon-bearing formation. In some embodiments, the fluid is substantially free of fluorinated surfactants. The term "substantially free of fluorinated surfactants" refers to fluid that may have a fluorinated surfactant in an amount insufficient for the fluid to have a cloud point (e.g., when it is below its critical micelle concentration). A fluid that is substantially free of fluorinated surfactant may be a fluid that has a fluorinated surfactant but in an amount insufficient to alter the wettability of, for example, a hydrocarbon-bearing formation under downhole conditions. A fluid that is substantially free of fluorinated surfactant includes those that have a weight percent of such polymers as low as 0 weight percent. The fluid may be useful for decreasing the concentration of at least one of the salts present in the brine before introducing the composition to the hydrocarbon-bearing formation. The change in brine composition may change the results of a phase behavior evaluation (e.g., the combination of a treatment composition with a first brine before the fluid preflush may result in precipitation of salt or the fluoroether compound while the combination of the treatment composition with the brine after the fluid preflush may result in no precipitation.)

In some embodiments of treatment methods disclosed herein, the fluid comprises at least one of toluene, diesel, heptane, octane, or condensate. In some embodiments, the fluid comprises at least one of water, methanol, ethanol, or isopropanol. In some embodiments, the fluid comprises at least one of a polyol or polyol ether independently having from 2 to 25 carbon atoms. In some embodiments, useful polyols have 2 to 20, 2 to 15, 2 to 10, 2 to 8, or 2 to 6 carbon atoms. In some embodiments, useful polyol ethers may have from 3 to 25 carbon atoms, 3 to 20, 3 to 15, 3 to 10, 3 to 8, or from 5 to 8 carbon atoms. Exemplary useful polyols and polyol ethers include any of those described above for solvents. In some embodiments, the fluid comprises at least one monohydroxy alcohol, ether, or ketone independently having up to four carbon atoms. In some embodiments, the fluid comprises at least one of nitrogen, carbon dioxide, or methane.

In some embodiments of the methods and treated hydrocarbon-bearing formations disclosed herein, the hydrocarbon-bearing formation has at least one fracture. In some embodiments, fractured formations have at least 2, 3, 4, 5, 6, 7, 8, 9, or 10 or more fractures. As used herein, the term "fracture" refers to a fracture that is man-made. In the field, for example, fractures are typically made by injecting a fracturing fluid into a subterranean geological formation at a rate and pressure sufficient to open a fracture therein (i.e., exceeding the rock strength).

In some embodiments of the methods disclosed herein, wherein treating the formation with the composition provides an increase in at least one of the gas permeability or the liquid permeability of the formation, the formation is a non-fractured formation (i.e., free of man-made fractures made, for example, by hydraulic fracturing). Advantageously, treatment methods disclosed herein typically provide an increase in at least one of the gas permeability or the hydrocarbon liquid permeability of the formation without fracturing the formation.

In some embodiments of the methods and treated hydrocarbon-bearing formations disclosed herein, wherein the hydrocarbon-bearing formation has at least one fracture, the fracture has a plurality of proppants therein. Before delivering the proppants into a fracture, the proppants may be treated with a fluoroether compound or may be untreated (e.g., may comprise less than 0.1% by weight fluoroether compound, based on the total weight of the plurality of proppants). In some embodiments, the fluoroether compound useful in practicing the present disclosure is adsorbed on at least a portion of the plurality of proppants.

Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

Proppants useful in practicing the present disclosure may have a particle size in a range from 100 micrometers to 3000 micrometers (i.e., about 140 mesh to about 5 mesh (ANSI)) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), or 300 micrometers to 600 micrometers (i.e., about 50 mesh to about 30 mesh).

In some embodiments of methods of treating fractured formations, the proppants form packs within a formation and/or wellbore. Proppants may be selected to be chemically compatible with the solvents and compositions described herein. The term "proppant" as used herein includes fracture proppant materials introducible into the formation as part of a hydraulic fracture treatment and sand control particulate introducible into the wellbore or formation as part of a sand control treatment such as a gravel pack or frac pack.

In some embodiments, methods according to the present disclosure include treating the hydrocarbon-bearing formation with the composition at least one of during fracturing or after fracturing the hydrocarbon-bearing formation. In some of these embodiments, the fracturing fluid, which may contain proppants, may be aqueous (e.g., a brine) or may contain predominantly organic solvent (e.g., an alcohol or a hydrocarbon). In some embodiments, it may be desirable for the fracturing fluid to include contain viscosity enhancing agents (e.g., polymeric viscosifiers), electrolytes, corrosion inhibitors, scale inhibitors, and other such additives that are common to a fracturing fluid.

In some embodiments of methods of treating fractured formations, the amount of the composition introduced into the fractured formation is based at least partially on the volume of the fracture(s). The volume of a fracture can be measured using methods that are known in the art (e.g., by pressure transient testing of a fractured well). Typically, when a fracture is created in a hydrocarbon-bearing subterranean formation, the volume of the fracture can be estimated using at least one of the known volume of fracturing fluid or the known amount of proppant used during the fracturing operation. Coil tubing, for example, may be used to deliver the treatment composition to a particular fracture. In some embodiments, in practicing the methods disclosed herein it may be desirable to isolate the fracture (e.g., with conventional packers) to be treated with the treatment composition.

In some embodiments, wherein the formation treated according to the methods described herein has at least one fracture, the fracture has a conductivity, and after the treatment composition treats at least one of the fracture or at least a portion of the plurality of proppants, the conductivity of the fracture is increased (e.g., by 25, 50, 75, 100, 125, 150, 175, 200, 225, 250, 275, or by 300 percent).

Fluoroether compounds may also be useful, for example, for treating proppants before using the proppants in a fracturing and propping operation. Treated proppants may be prepared, for example, by dissolving or dispersing the fluoroether compound in a dispersing medium (e.g., water and/or organic solvent (e.g., alcohols, ketones, esters, alkanes and/or fluorinated solvents (e.g., hydrofluoroethers and/or perfluorinated carbons)) that is then applied to the particles. Optionally, a catalyst can be added (e.g., a Lewis acid or Lewis base). The amount of liquid medium used should be sufficient to allow the solution or dispersion to generally evenly wet the proppants being treated. Typically, the concentration of the fluoroether compound in the solution or dispersion is the range from about 5% to about 20% by weight, although amounts outside of this range may also be useful. The proppants are typically treated with the fluoroether compound solution or dispersion at temperatures in the range from about 25° C. to about 50° C., although temperatures outside of this range may also be useful. The treatment solution or dispersion can be applied to the proppants using techniques known in the art for applying solutions or dispersions to proppants (e.g., mixing the solution or dispersion and proppants in a vessel (in some embodiments under reduced pressure) or spraying the solutions or dispersions onto the particles). After application of the treatment solution or dispersion to the particles, the liquid medium can be removed using techniques known in the art (e.g., drying the particles in an oven). Typically, about 0.1 to about 5 (in some embodiments, for example, about 0.5 to about 2) percent by weight fluorinated polymer is added to the particles, although amounts outside of this range may also be useful.

Referring to FIG. 1, an exemplary offshore oil platform is schematically illustrated and generally designated 10. Semisubmersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

While the drawing depicts an offshore operation, the skilled artisan will recognize that the methods for treating a production zone of a wellbore are equally well-suited for use in onshore operations. Also, while the drawing depicts a vertical well, the skilled artisan will also recognize that methods according to the present disclosure are equally well-suited for use in deviated wells, inclined wells or horizontal wells.

Selected Embodiments of the Disclosure

1. A method comprising contacting a hydrocarbon-bearing formation with a treatment composition comprising solvent and a fluoroether compound, wherein the fluoroether compound comprises at least one first divalent unit represented by formula:

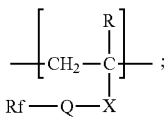

wherein
each Rf is independently selected from the group consisting of:

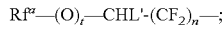

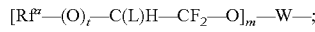

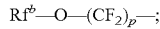

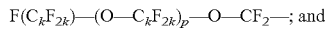

each Q is independently selected from the group consisting of a bond, —C(O)—N(R$^1$)—, and —C(O)—O—;
each X is independently selected from the group consisting of alkylene and arylalkylene, wherein alkylene and arylalkylene are each optionally interrupted by at least one ether linkage and optionally terminated by —N(R$^1$)—C(O)— or —O—C(O)—;
R and R$^1$ are each independently selected from the group consisting of hydrogen and alkyl having from 1 to 4 carbon atoms;
Rf$^a$ represents a partially or fully fluorinated alkyl group having from 1 to 6 carbon atoms and optionally interrupted with at least one oxygen atom;
Rf$^b$ is selected from the group consisting of CF$_3$CFH— and F(C$_j$F$_{2j}$)—;
L is selected from the group consisting of F and CF$_3$;
L' is F or H;
W is selected from the group consisting of alkylene and arylene;
L$^1$ is selected from the group consisting of —CF$_2$—, —CF$_2$CF$_2$—, and —CF(CF$_3$)—;
t is 0 or 1, wherein when Rf is represented by formula Rf$^a$—(O)$_t$—CHF—(CF$_2$)$_n$— and t is 0, then Rf$^a$ is interrupted with at least one oxygen atom;
m is 1, 2, or 3;
n is 0 or 1;
j is an value from 1 to 4;
each k is independently 1 or 2;
each p is independently an value from 1 to 6; and
z is an value from 0 to 3.

2. The method according to embodiment 1, wherein each Rf is independently selected from the group consisting of:

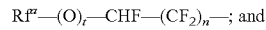

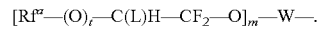

3. The method according to embodiment 1, wherein each Rf is independently selected from the group consisting of:

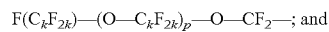

4. The method according to embodiment 1, 2, or 3, wherein t is 1, and wherein Rf$^a$ is selected from the group consisting of:
fully fluorinated alkyl groups having from 1 to 6 carbon atoms; and
fully fluorinated groups represented by formula:

wherein
R$_f^1$ is a perfluorinated alkyl group having from 1 to 3 carbon atoms;
Each R$_f^2$ is independently perfluorinated alkylene having from 1 to 3 carbon atoms; and
x is a value from 1 to 4.

5. The method according to embodiment 1, 2, or 3, wherein t is 0, and wherein Rf$^a$ is a fully fluorinated group represented by formula:

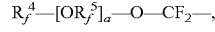

wherein
R$_f^4$ is a perfluorinated alkyl group having from 1 to 3 carbon atoms;
each R$_f^5$ is independently perfluorinated alkylene having from 1 to 3 carbon atoms; and
a is a value from 0 to 4.

6. The method according to embodiment 1, 2, or 3, wherein Rf is:

$C_3F_7$—O—CHF—;

$CF_3$—O—$CF_2CF_2$—$CF_2$—O—CHF—;

$CF_3$—O—$CF_2$—$CF_2$—O—CHF—;

$CF_3$—O—$CF_2$—O—$CF_2$—$CF_2$—O—CHF—;

$CF_3$—O—CHF—$CF_2$—;

$CF_3$—O—$CF_2$—$CF_2$—O—CHF—$CF_2$—;

$CF_3$—$CF_2$—O—CHF—$CF_2$—;

$CF_3$—O—$CF_2$—$CF_2$—$CF_2$—O—CHF—$CF_2$—;

$CF_3$—O—$CF_2$—O—$CF_2$—$CF_2$—O—CHF—$CF_2$—;

$CF_3$—O—$CF_2$—CHF—;

$C_3F_7$—O—$CF_2$—CHF—;

$CF_3$—O—$CF_2$—$CF_2$—$CF_2$—O—$CF_2$—CHF—;

$CF_3$—O—$CF_2$—O—$CF_2$—$CF_2$—O—$CF_2$—CHF—;

$CF_3$—O—$CF_2$—CHF—$CF_2$—;

$C_2F_5$—O—$CF_2$—CHF—$CF_2$—;

$C_3F_7$—O—$CF_2$—CHF—$CF_2$—;

$CF_3$—O—$CF_2$—$CF_2$—$CF_2$—O—$CF_2$—CHF—$CF_2$—; or $CF_3$—O—$CF_2$—O—$CF_2$—$CF_2$—O—$CF_2$—CHF—$CF_2$—.

7. The method according to embodiment 1, 2, or 3, wherein Rf:

$CF_3$—O—CHF—$CF_2$—O—$CH_2$—;

$CF_3$—O—$CF_2$—$CF_2$—$CF_2$—O—CHF—$CF_2$—O—$CH_2$—;

$C_3F_7$—O—CHF—$CF_2$—O—$CH_2$—;

$C_3F_7$—O—CHF—$CF_2$—O—$CH_2$—$CH_2$—;

$C_3F_7$—O—$CF_2$—CHF—$CF_2$—$OCH_2$—;

$CF_3$—CHF—$CF_2$—O—$CH_2$—; or $C_3F_7$—$CF_2$—CHF—$CF_2$—$OCH_2$—.

8. The method according to embodiment 1, wherein Rf is selected from the group consisting of $CF_3CFH$—O—$(CF_2)_3$— and $CF_3CFH$—O—$(CF_2)_5$—.

9. The method according to embodiment 1, wherein Rf is $CF_3$-$(O$—$CF_2)_p$—O—$CF_2$—, and wherein p is 1, 2, or 3.

10. The method according to embodiment 1, wherein Rf is $CF_3$—O—$(CF_2)_3$—O—$CF_2$—.

11. The method according to any preceding embodiment, wherein each first divalent unit is represented by formula:

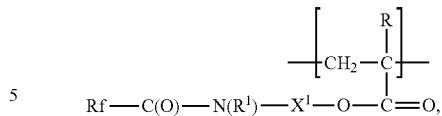

wherein each $X^1$ is independently selected from the group consisting of alkylene and arylalkylene, and wherein alkylene and arylalkylene are each optionally interrupted by at least one ether linkage.

12. The method according to any preceding embodiment, wherein the fluoroether compound further comprises at least one divalent unit represented by formula:

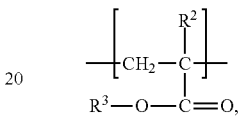

wherein each $R^2$ is independently selected from the group consisting of hydrogen and alkyl having from 1 to 4 carbon atoms; and each $R^3$ is independently alkyl having from 1 to 30 carbon atoms.

13. The method according to any preceding embodiment, wherein the fluoroether compound further comprises a polyalkyleneoxy segment.

14. The method according to embodiment 13, wherein the fluoroether compound comprises at least one ether-containing divalent unit represented by formula:

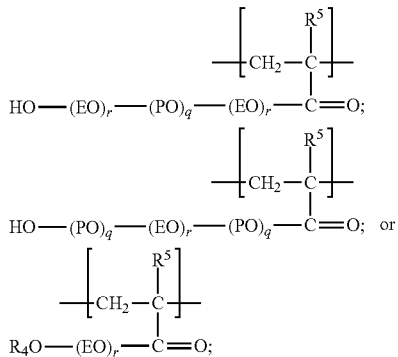

wherein $R_4$ and $R_5$ are each independently hydrogen or alkyl of 1 to 4 carbon atoms;

EO represents —$CH_2CH_2O$—;

each PO independently represents —$CH(CH_3)CH_2O$— or —$CH_2CH(CH_3)O$—;

each r is independently an value from 1 to 128; and each q is independently an value from 0 to 55.

15. The method according to embodiment 13, wherein the polyalkyleneoxy segment is present in units represented by formula:

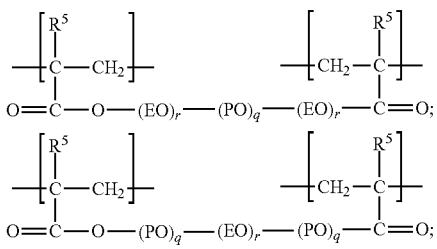

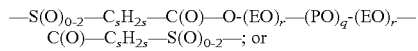

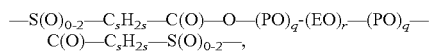

wherein each $R_5$ is independently hydrogen or alkyl of 1 to 4 carbon atoms;

EO represents —CH$_2$CH$_2$O—;

each PO independently represents —CH(CH$_3$)CH$_2$O— or —CH$_2$CH(CH$_3$)O—;

each r is independently an value from 1 to 128;

each q is independently an value from 0 to 55; and each s is independently an integer from 1 to 5.

16. The method according to any preceding embodiment, wherein the fluoroether compound further comprises at least one anionic divalent unit represented by formula:

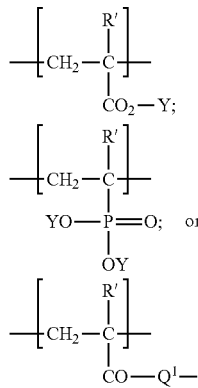

wherein $Q^1$ is selected from the group consisting of —O—, —S—, and —N(R$^1$)—;

R' and $R^1$ are each independently selected from the group consisting of hydrogen and alkyl having from 1 to 4 carbon atoms;

V is alkylene that is optionally interrupted by at least one ether linkage or amine linkage;

each Y is independently selected from the group consisting of hydrogen, a counter cation, and a bond to the hydrocarbon-bearing formation; and Z is selected from the group consisting of —P(O)(OY)$_2$, —O—P(O)(OY)$_2$, —SO$_3$Y, and CO$_Z$Y.

17. The method according to any preceding embodiment, wherein the fluoroether compound further comprises at least one divalent unit represented by formula:

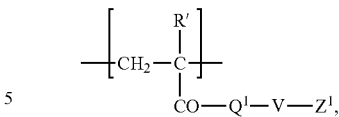

wherein $Q^1$ is selected from the group consisting of —O—, —S—, and —N(R$^1$)—;

R' and $R^1$ are each independently selected from the group consisting of hydrogen and alkyl having from 1 to 4 carbon atoms;

V is alkylene that is optionally interrupted by at least one ether linkage or amine linkage; and $Z^1$ is selected from the group consisting of —[N(R$^8$)$_3$]$^+$M$^-$, —N$^+$(OY$^1$)(R$^9$)$_3$, —N$^+$(R$^8$)$_2$—(CH$_2$)$_g$—SO$_3$Y$^1$, and —N$^+$(R$^8$)$_2$—(CH$_2$)$_g$—CO$_2$Y$^1$, wherein each $R^8$ is independently selected from the group consisting of hydrogen and alkyl having from 1 to 6 carbon atoms;

each $R^9$ is independently selected from the group consisting of hydrogen and alkyl having from 1 to 6 carbon atoms, wherein alkyl is optionally substituted by at least one halogen, alkoxy, nitro, or nitrile group, or two $R^9$ groups may join to form a 5 to 7-membered ring optionally containing at least one O, N, or S and optionally substituted by alkyl having 1 to 6 carbon atoms;

each g is independently an integer from 2 to 6;

M$^-$ is a counter anion; and

Y$^1$ is selected from the group consisting of hydrogen and a free anion.

18. The method according to any preceding embodiment, wherein the fluoroether compound further comprises at least one divalent unit represented by formula:

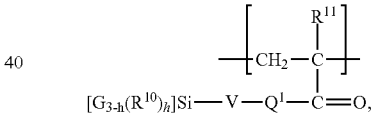

wherein each $R^{10}$ is independently selected from the group consisting of alkyl having from 1 to 6 carbon atoms and aryl;

$Q^1$ is selected from the group consisting of —O—, —S—, and —N(R$^1$)—;

$R^1$ and $R^{11}$ are each independently selected from the group consisting of hydrogen and alkyl having from 1 to 4 carbon atoms;

V is alkylene that is optionally interrupted by at least one ether linkage or amine linkage;

each G is independently selected from the group consisting of hydroxyl, alkoxy, acyloxy, and halogen; and h is 0, 1, or 2.

19. The method according to any preceding embodiment, wherein the fluoroether compound is a polymer having a weight average molecular weight in a range from 1,000 grams per mole to 100,000 grams per mole.

20. The method according to any preceding embodiment, wherein the hydrocarbon-bearing formation comprises at least one of sandstone, shale, conglomerate, diatomite, or sand.

21. The method according to any preceding embodiment, wherein the hydrocarbon-bearing formation comprises at least one of carbonates or limestone.

22. The method according to any preceding embodiment, wherein the hydrocarbon-bearing formation has at least one fracture, and wherein the fracture has a plurality of proppants therein.

23. The method according to any preceding embodiment, wherein the solvent comprises at least one of water, an alcohol, an ether, or a ketone, wherein the alcohol, ether, and ketone each independently have up to 4 carbon atoms.

24. The method according to any preceding embodiment, wherein before contacting the hydrocarbon-bearing formation with the treatment composition, the hydrocarbon-bearing formation has at least one of brine or liquid hydrocarbons, and wherein the hydrocarbon-bearing formation has at least a gas permeability that is increased after it is contacted with the treatment composition.

25. The method according to embodiment 24, further comprising contacting the hydrocarbon-bearing formation with a fluid before contacting the hydrocarbon-bearing formation with the treatment composition, wherein the fluid at least one of at least partially solubilizes or partially displaces at least one of the brine or liquid hydrocarbons in the hydrocarbon-bearing formation.

26. The method according to any preceding embodiment, wherein the hydrocarbon-bearing formation is penetrated by a wellbore, and wherein a region near the wellbore is contacted with the treatment composition.

27. A hydrocarbon-bearing formation comprising a surface, wherein at least a portion of the surface is contacted according to the method of any preceding embodiment.

28. A hydrocarbon-bearing formation comprising a surface, wherein at least a portion of the surface is in contact with a fluorinated siloxane, the fluorinated siloxane comprising at least one condensation product of a fluorinated silane comprising at least one divalent unit represented by formula:

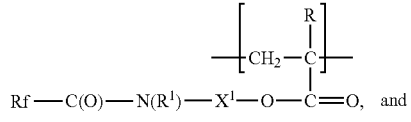

at least one divalent unit represented by formula:

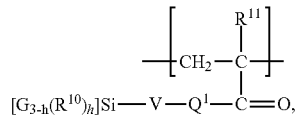

wherein
each Rf is independently selected from the group consisting of:

$Rf^a$—(O)$_t$—CHL'-(CF$_2$)$_n$—;

[$Rf^a$—(O)$_t$—C(L)H—CF$_2$—O]$_m$—W—;

$Rf^b$—O—(CF$_2$)$_p$—;

F(C$_k$F$_{2k}$)—(O—C$_k$F$_{2k}$)$_p$—O—CF$_2$—; and

CF$_3$—O—(CF$_2$)$_3$—(OCF(CF$_3$)—CF$_2$)$_z$—O-L$^1$-;

$Rf^a$ represents a partially or fully fluorinated alkyl group having from 1 to 6 carbon atoms and optionally interrupted with at least one oxygen atom;

$Rf^b$ is selected from the group consisting of CF$_3$CFH— and F(C$_j$F$_{2j}$)—;

L is selected from the group consisting of F and CF$_3$;

W is selected from the group consisting of alkylene and arylene;

L' is F or H;

L$^1$ is selected from the group consisting of —CF$_2$—, —CF$_2$CF$_2$—, and —CF(CF3)-;

t is 0 or 1, wherein when Rf is represented by formula $Rf^a$—(O)$_t$—CHL'-(CF$_2$)$_n$— and t is 0, then $Rf^a$ is interrupted with at least one oxygen atom;

m is 1, 2, or 3;

n is 0 or 1;

each j is independently an value from 1 to 4;

each k is independently 1 or 2;

each p is independently an value from 1 to 6;

z is an value from 0 to 3;

X$^1$ is independently selected from the group consisting of alkylene and arylalkylene, and wherein alkylene and arylalkylene are each optionally interrupted by at least one ether linkage;

each R$^{10}$ is independently selected from the group consisting of alkyl having from 1 to 6 carbon atoms and aryl;

Q$^1$ is selected from the group consisting of —O—, —S—, and —N(R$^1$)—;

R, R$^1$, and R$^{11}$ are each independently selected from the group consisting of hydrogen and alkyl having from 1 to 4 carbon atoms;

V is alkylene that is optionally interrupted by at least one ether linkage or amine linkage;

each G is independently selected from the group consisting of hydroxyl, alkoxy, acyloxy, and halogen; and h is 0, 1, or 2.

Advantages and embodiments of the methods disclosed herein are further illustrated by the following examples, but the particular materials and amounts thereof recited in these examples, as well as other conditions and details, should not be construed to unduly limit this invention. Unless otherwise noted, all parts, percentages, ratios, etc. in the examples and the rest of the specification are by weight. In the Tables, "nd" means not determined

EXAMPLES

Preparation 1: CF$_3$OCF$_2$OCF$_2$OCF$_2$OCF$_2$C(O)NHCH$_2$CH$_2$OC(O)CH=CH$_2$ Part A The methyl ester of perfluoro-3,5,7,9-tetraoxadecanoic acid was prepared according to the method described in U.S. Pat. App. Pub. No. 2007/0015864 (Hintzer et al.) in the Preparation of Compound 1, the disclosure of which preparation is incorporated herein by reference.

Part B

The methyl ester from Part A was treated with ethanolamine according to the method described on column 16, lines 37-62 of U.S. Pat. No. 7,094,829 (Audenaert et al.), the disclosure of which method is incorporated herein by reference.

Part C

In a three-necked 500-mL flask fitted with a stirrer, thermometer and condenser were placed 0.1 mole of the material from Part B, 60 grams methyl ethyl ketone (MEK), 60 grams of a hydrofluoroether obtained from 3M Company, St. Paul, Minn. under the trade designation "HFE-7200", 0.1 mole (10.1 grams) of triethylamine, 0.01 grams hydroquinone monomethyl ether (MEHQ) and 0.01 grams phenothazine. The mixture was cooled to about 5° C. in an ice bath. Then 0.11 mole acryloylchloride (10.1 grams) was added dropwise over about 1 hour under nitrogen. An exothermic reaction was noticed, and precipitate formed. The temperature was allowed to rise to 25° C. over a period of about 1 hour while the reaction mixture was stirred. The stirring was continued for 1 hour under nitrogen at 50° C. The resulting reaction mixture was washed 3 times with 200 mL of water and the organic layer was separated off. All solvents were distilled of at 50° C. under vacuum. A clear, yellow-brown liquid was obtained, which was identified to be $CF_3OCF_2OCF_2OCF_2OCF_2C(O)NHCH_2CH_2C(O)CH=CH_2$ using nuclear magnetic resonance spectroscopy.

Preparation 2: $CF_3OCF_2CF_2CF_2OCF_2C(O)NHCH_2CH_2C(O)CH=CH_2$

Preparation 2 was made using the method of Preparation 1, with the following modifications. Perfluoro-3,7-dioxaoctanoic acid was obtained from Anles Ltd., St. Petersburg, Russia. The methyl ester of perfluoro-3,7-dioxaoctanoic acid was prepared by esterification according to the method described in U.S. Pat. App. Pub. No. 2007/0015864 (Hintzer et al.) in the Preparation of Compound 1, the disclosure of which preparation is incorporated herein by reference. The methyl ester was then treated with ethanolamine as described in Part B of Preparation 1. The resulting alcohol was treated according to the method of Part C of Preparation 1 to provide $CF_3OCF_2CF_2CF_2OCF_2C(O)NHCH_2CH_2C(O)CH=CH_2$.

Preparation 3: $CF_3OCF_2CF_2CF_2OCHFCF_2C(O)NHCH_2CH_2C(O)CH=CH_2$

Preparation 3 was made using the method of Preparation 1, with the following modifications. The methyl ester of 3-H-perfluoro-4,8-dioxanonanoic acid $(CF_3O(CF_2)_3OCHFCF_2COOCH_3)$ was prepared according to the method described in the synthesis of compound 2 in U.S. Pat. App. Pub. No. 2007/0142541 (Hintzer et al.); the disclosure of this synthesis is incorporated herein by reference. The methyl ester was then treated with ethanolamine as described in Part B of Preparation 1. The resulting alcohol was treated according to the method of Part C of Preparation 1 (above) to provide the title compound.

Fluoroether Compound 1

In a three-necked 100-mL flask fitted with a thermometer, stirrer, condenser and heating mantle were placed 3 grams Preparation 2 acrylate, 14 grams of a 50% solution of the monoacrylate of a block copolymer of ethylene oxide and propylene oxide (obtained from BASF Corporation, Ludwigshafen, Germany, under the trade designation "PLURONIC L44") in toluene, 3 grams hydrofluoroether obtained from 3M Company, St. Paul, Minn., under the trade designation "HFE-7200", 0.5 gram of 3-mercapto-1,2-propanediol, and 0.05 gram 2,2'-azobis(2-methylpropionitrile) (AIBN). The reaction mixture was degassed 3 times using nitrogen and aspirator vacuum and then heated to 75° C. for 6 hours. Another charge of 0.02 gram AIBN was added and the reaction was continued for 16 hours at 75° C. under a nitrogen atmosphere. Solvent was then removed at about 80-90° C. and aspirator vacuum. A clear amber, viscous liquid resulted.

The monoacrylate of block copolymer of ethylene oxide and propylene oxide was prepared according to the method of Example 1 of U.S. Pat. No. 3,787,351 (Olson), which example is incorporated herein by reference, except using a 1:1 molar ratio of acrylic acid and the block copolymer.

Fluoroether Compounds 2 and 3

Fluoroether Compounds 2 and 3 were prepared according to the method of Fluoroether Compound 1, except using the acrylates of Preparation 1 and Preparation 3, respectively, instead of the acrylate of Preparation 2.

Fluoroether Compound 4

Fluoroether Compound 4 was prepared according to the method of Fluoroether compound 1, except using 12 grams (instead of 14 grams) of a 50% solution of the monoacrylate of a block copolymer of ethylene oxide and propylene oxide (obtained from BASF Corporation under the trade designation "PLURONIC L44") in toluene and adding 1 gram of acrylic acid.

Fluoroether Compound 5

Fluoroether Compound 5 was prepared according to the method of Fluoroether compound 1, except using 12 grams (instead of 14 grams) of a 50% solution of the monoacrylate of a block copolymer of ethylene oxide and propylene oxide (obtained from BASF Corporation under the trade designation "PLURONIC L44") in toluene and adding 1 gram of 2-(dimethylamino)ethyl methacrylate obtained from Sigma-Aldrich, Bornem, Belgium. After polymerization and before solvent was removed, 1 gram of diethyl sulfate obtained from Sigma-Aldrich was added, and the reaction was heated for 2 hours at 50° C. under a nitrogen atmosphere.

Fluoroether Compound 6

Fluoroether Compound 6 was prepared according to the method of Fluoroether compound 1, except using 12 grams (instead of 14 grams) of a 50% solution of the monoacrylate of a block copolymer of ethylene oxide and propylene oxide (obtained from BASF Corporation under the trade designation "PLURONIC L44") in toluene and adding 1 gram of 2-(dimethylamino)ethyl methacrylate obtained from Sigma-Aldrich. After polymerization and before solvent was removed, 0.8 gram of 1,3-propane sultone obtained from Sigma-Aldrich was added, and the reaction was heated for 4 hours at 60° C. under a nitrogen atmosphere.

Fluoroether Compound 7

Fluoroether Compound 7 was prepared according to the method of Fluoroether compound 1, except using 12 grams (instead of 14 grams) of a 50% solution of the monoacrylate of a block copolymer of ethylene oxide and propylene oxide (obtained from BASF Corporation under the trade designation "PLURONIC L44") in toluene and adding 1 gram of 3-(trimethoxysilyl)propyl methacrylate obtained from Sigma-Aldrich.

Examples 1 to 3

Treatment Solution Preparation:
For Examples 1 to 3, each of Fluoroether Compounds 1 to 3 were combined at 1% by weight with 2-butoxyethanol (69.5% by weight) and ethanol (29.5% by weight) to prepare about 200 grams of treatment solution. These are referred to as Treatment Solutions 1 to 3, respectively. The components were mixed together using a magnetic stirrer and a magnetic stir bar.

Figure 2:
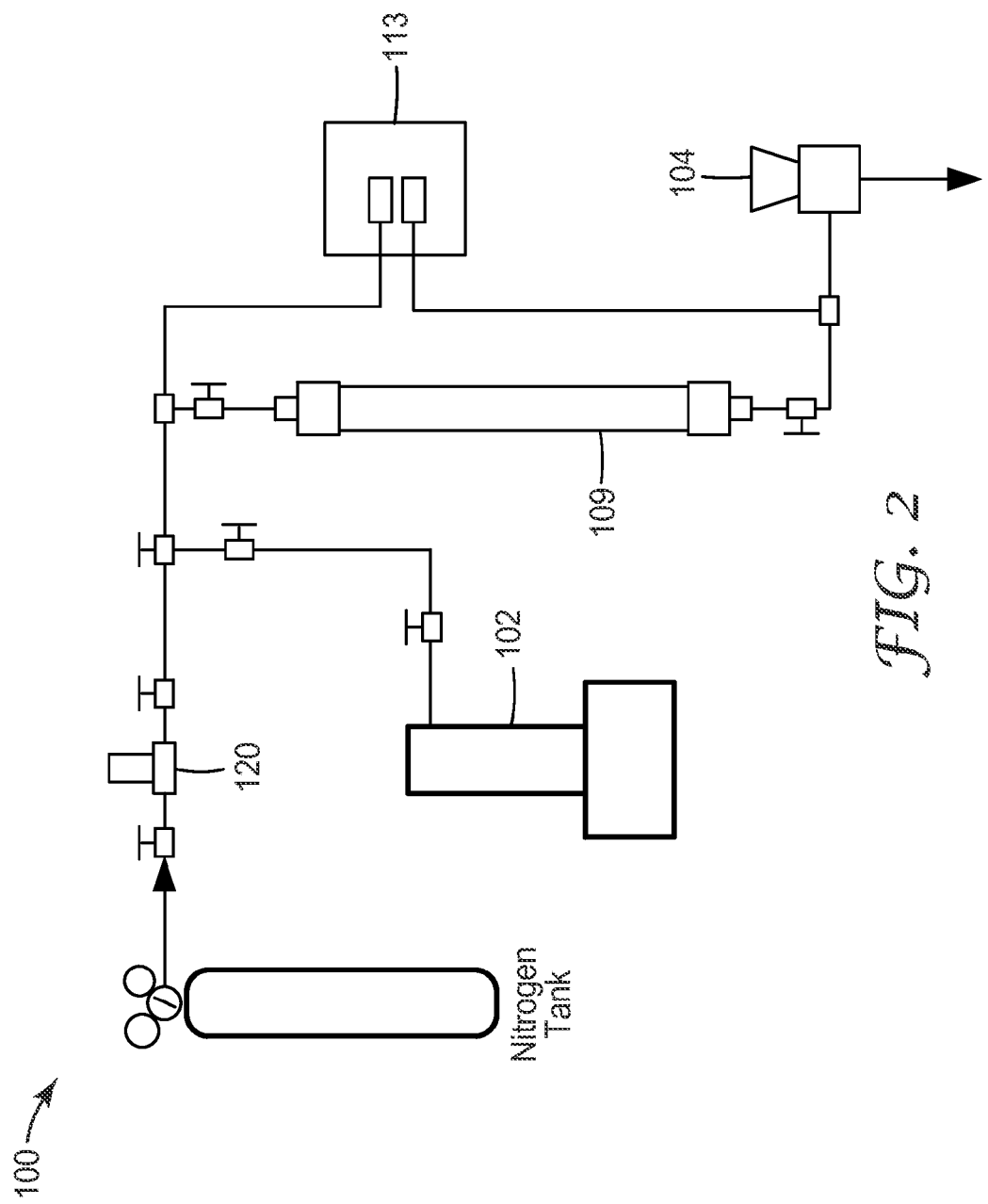
FIG. 2 is a schematic illustration of the flow apparatus used for Examples 1 to 10 and Control Examples A to C.

Flow Setup and Procedure:

A schematic diagram of a flow apparatus 100 used to determine relative permeability of sea sand or particulate calcium carbonate is shown in FIG. 2. Flow apparatus 100 included positive displacement pump 102 (Model Gamma/4-W 2001 PP, obtained from Prolingent AG, Regensdorf, Germany) to inject n-heptane at constant rate. Nitrogen gas was injected at constant rate through a gas flow controller 120 (Model DK37/MSE, Krohne, Duisburg, Germany). Pressure indicators 113, obtained from Siemens under the trade designation "SITRANS P" 0-16 bar, were used to measure the pressure drop across a sea sand pack in vertical core holder 109 (20 cm by 12.5 cm$^2$) (obtained from 3M Company, Antwerp, Belgium). A back-pressure regulator (Model No. BS(H)$_2$; obtained from RHPS, The Netherlands) 104 was used to control the flowing pressure upstream and downstream of core holder 109. Core holder 109 was heated by circulating silicone oil, heated by a heating bath obtained from Lauda, Switzerland, Model R22.

The core holder was filled with sea sand (obtained from Sigma-Aldrich, grade 60-70 mesh) and then heated to 75° C. The temperature of 75° C. was maintained for each of the flows described below. A pressure of about 5 bar ($5 \times 10^5$ Pa) was applied, and the back pressure was regulated in such a way that the flow of nitrogen gas through the sea sand was about 500 to 1000 mL/minute. The initial gas permeability was calculated using Darcy's law.

Synthetic brine according to the natural composition of North Sea brine, was prepared by mixing 5.9% sodium chloride, 1.6% calcium chloride, 0.23% magnesium chloride, and 0.05% potassium chloride and distilled water up to 100% by weight. The brine was then introduced into the core holder at about 1 mL/minute using displacement pump 102.

Heptane was then introduced into the core holder at about 0.5 mL/minute using displacement pump 102. Nitrogen and n-heptane were co-injected into the core holder until steady state was reached.

The treatment solution was then injected into the core at a flow rate of 1 mL/minute for about one pore volume. The gas permeability after treatment was calculated from the steady state pressure drop, and improvement factor was calculated as the permeability after treatment/permeability before treatment.

Heptane was then injected for about four to six pore volumes. The gas permeability and improvement factor were again calculated.

For Examples 1 to 3, the liquid used for each injection, the initial pressure, the pressure change ($\Delta P$), the flow rate for each injection, the amount of liquid used for each injection, the flow rate of gas through the core (Q), the gas permeability (K), and the improvement factor (PI) are shown in Table 1, below.

Control Example A

Control Example A was carried out according to the method of Examples 1 to 3 with the exception that the treatment composition contained only 2-butoxyethanol (70% by weight) and ethanol (30% by weight). The liquid used for each injection, the initial pressure, the pressure change ($\Delta P$), the flow rate for each injection, the amount of liquid used for each injection, the flow rate of gas through the core (Q), the gas permeability (K), and the improvement factor (PI) are shown in Table 1, below.

TABLE 1

| Example | Liquid | Pressure (initial) | $\Delta P$ | Flow (mL/min) | Amount Liquid (g) | Q (mL/sec) | K (Darcy) | PI |
|---|---|---|---|---|---|---|---|---|
| Ex. 1 | none | 5.1 | 0.01 | 520 | none | 8.7 | 23.6 | |
| | brine | 5.9 | 0.08 | 460 | 55 | 8 | 2.9 | |
| | heptane | 5.8 | 0.08 | 570 | 55 | 9.8 | 3.9 | |
| | Treatment Sol. 1 | 6.25 | 0.03 | 600 | 120 | 10.1 | 8.6 | 2.2 |
| | heptane | 5.44 | 0.03 | 650 | 190 | 10.7 | 11.7 | 2.9 |
| Ex. 2 | none | 5.1 | 0.01 | 570 | none | 9.5 | 25.8 | |
| | brine | 5.3 | 0.1 | 510 | 50 | 8.9 | 2.5 | |
| | heptane | 5.4 | 0.09 | 520 | 60 | 9.1 | 2.9 | |
| | Treatment Sol. 2 | 5.7 | 0.04 | 550 | 100 | 9.4 | 6.6 | 2.2 |
| | heptane | 5.2 | 0.04 | 580 | 185 | 9.9 | 7.5 | 2.6 |
| Ex. 3 | none | 5.1 | 0.01 | 600 | none | 10 | 27.2 | |
| | brine | 5.5 | 0.05 | 600 | 50 | 10.2 | 5.2 | |
| | heptane | 5.5 | 0.05 | 620 | 55 | 10.6 | 5.8 | |
| | Treatment Sol. 3 | 6.03 | 0.03 | 660 | 115 | 11.1 | 10.1 | 1.8 |
| | heptane | 5.1 | 0.02 | 670 | 160 | 11.2 | 12.7 | 2.22 |
| Control A | none | 5.2 | 0.01 | 860 | none | 14.3 | 38.9 | |
| | brine | 5.5 | 0.15 | 650 | 55 | 11.6 | 2.2 | |
| | heptane | 5.4 | 0.13 | 400 | 65 | 7.1 | 1.4 | |
| | 2-butoxy-ethanol/ ethanol | 5.6 | 0.09 | 400 | 150 | 6.9 | 2.0 | 1.4 |
| | heptane | 5.5 | 0.14 | 420 | 130 | 7.6 | 1.5 | 1.03 |

Examples 4 and 5

Treatment Solution:

For Examples 4 and 5, Treatment Solutions 1 and 3, described in Examples 1 to 3, were used.

Flow Setup and Procedure:

Examples 4 and 5 were carried out according to the method of Examples 1 to 3, except that no heptane flows were carried out.

For Examples 4 and 5, the liquid used for each injection, the initial pressure, the pressure change ($\Delta P$), the flow rate for each injection, the amount of liquid used for each injection, the flow rate of gas through the core (Q), the gas permeability (K), and the improvement factor (PI) are shown in Table 2, below.

Control Example B

Control Example B was carried out according to the method of Examples 4 and 5 with the exception that the treatment composition contained 1% by weight cocoamidopropylsulfobetaine, obtained from SEPPIC, France, under the trade designation "AMONYL 675 SB", 2-butoxyethanol (69.5% by weight) and ethanol (29.5% by weight). The liquid used for each injection, the initial pressure, the pressure change ($\Delta P$), the flow rate for each injection, the amount of liquid used for each injection, the flow rate of gas through the core (Q), the gas permeability (K), and the improvement factor (PI) are shown in Table 2, below.

TABLE 2

| Example | Liquid | Pressure (initial) | $\Delta P$ | Flow (mL/min) | Amount Liquid (g) | Q | K | PI |
|---|---|---|---|---|---|---|---|---|
| Ex. 4 | none | 5.6 | 0.01 | 800 | none | 13.3 | 36.7 | |
| | brine | 5.7 | 0.05 | 450 | 50 | 7.7 | 4.6 | |
| | Treatment Sol. 1 | 6.11 | 0.03 | 650 | 150 | 10.9 | 10.6 | 2.3 |
| | brine | 6.3 | 0.04 | 750 | 450 | 12.7 | 9.9 | 2.2 |
| Ex. 5 | none | 5.4 | 0.01 | 820 | none | 13.7 | 37.1 | |
| | brine | 6.1 | 0.08 | 1050 | 70 | 18.2 | 5.9 | |
| | Treatment Sol. 3 | 6.3 | 0.04 | 1200 | 150 | 20.4 | 13.2 | 2.2 |
| | brine | 6.2 | 0.04 | 1220 | 360 | 20.7 | 13.1 | 2.2 |
| Control B | None | 5.4 | 0.01 | 950 | none | 15.8 | 43 | |
| | Brine | 5.9 | 0.1 | 1200 | 155 | 21 | 5.6 | |
| | Treatment Comp. Control B | 6.3 | 0.05 | 1000 | 150 | 17.1 | 9.8 | 1.75 |
| | brine | 6.4 | 0.05 | 950 | 80 | 16.1 | 8.8 | 1.6 |
| | brine | 6.4 | 0.1 | 820 | 180 | 14.4 | 4.1 | 0.7 |

Example 6

Sample Preparation:

For Example 6, the Treatment Solution preparation of Example 1 was used, but the solvent was 100% ethanol. This is referred to as Treatment Solution 4.

Flow Setup and Procedure:

Example 6 was carried out according to the method of Examples 1 to 3, except that particulate calcium carbonate (obtained from Merck, Darmstadt, Germany as granular marble, particle size in a range from 0.5 mm to 2 mm) was used instead of sea sand.

The liquid used for each injection, the initial pressure, the pressure change ($\Delta P$), the flow rate for each injection, the amount of liquid used for each injection, the flow rate of gas through the core (Q), the gas permeability (K), and the improvement factor (PI) are shown in Table 3, below.

TABLE 3

| Example | Liquid | Pressure (initial) | $\Delta P$ | Flow (mL/min) | Amount Liquid (g) | Q | K | PI |
|---|---|---|---|---|---|---|---|---|
| Ex. 6 | none | 5.0 | 0.01 | 480 | none | 8 | 21.8 | |
| | brine | 5.3 | 0.13 | 400 | 45 | 7.1 | 1.5 | |
| | heptane | 5.5 | 0.13 | 380 | 80 | 6.8 | 1.4 | |
| | Treatment Sol. 4 | 5.6 | 0.06 | 400 | 50 | 6.8 | 3.3 | 2.4 |
| | heptane | 5.4 | 0.10 | 400 | 140 | 7.0 | 1.9 | 1.4 |
| Control Ex. C | none | 5.0 | 0.01 | 580 | none | 9.7 | 26.3 | |
| | brine | 5.4 | 0.15 | 500 | 48 | 9.0 | 1.6 | |
| | heptane | 5.4 | 0.11 | 420 | 60 | 7.4 | 1.9 | |
| | ethanol | 5.7 | 0.07 | 450 | 100 | 7.8 | 2.9 | 1.5 |
| | heptane | 5.4 | 0.10 | 380 | 150 | 6.6 | 1.8 | 0.9 |

Control Example C

Control Example C was carried out according to the method of Example 6 with the exception that the treatment composition contained only ethanol. The liquid used for each injection, the initial pressure, the pressure change (ΔP), the flow rate for each injection, the amount of liquid used for each injection, the flow rate of gas through the core (Q), the gas permeability (K), and the improvement factor (PI) are shown in Table 3, above.

Examples 7 and 8

Treatment Solution Preparation:

For Examples 7 and 8, Fluoroether Compounds 4 and 7, respectively, were combined at 2% by weight with 2-butoxy-ethanol (69% by weight) and ethanol (29% by weight) to prepare about 200 grams of treatment solution. The components were mixed together using a magnetic stirrer and a magnetic stir bar. The resulting solutions are referred to as Treatment Solutions 5 and 6, respectively.

Flow Setup and Procedure:

Examples 7 and 8 were carried out according to the method of Examples 1 to 3, except that particulate calcium carbonate (obtained from Merck, Darmstadt, Germany as granular marble, particle size in a range from 0.5 mm to 2 mm) was used instead of sea sand.

The liquid used for each injection, the initial pressure, the pressure change (ΔP), the flow rate for each injection, the amount of liquid used for each injection, the flow rate of gas through the core (Q), the gas permeability (K), and the improvement factor (PI) are shown in Table 4, below.

TABLE 4

| Example | Liquid | Pressure (initial) | ΔP | Flow (mL/min) | Amount Liquid (g) | Q (mL/sec) | K (Darcy) | PI |
|---|---|---|---|---|---|---|---|---|
| Ex. 7 | none | 5.1 | 0.01 | 500 | none | 8.3 | 22.7 | |
| | brine | 5.2 | 0.14 | 460 | 48 | 8.2 | 1.6 | |
| | heptane | 5.3 | 0.13 | 400 | 80 | 7.1 | 1.5 | |
| | Treatment Sol. 5 | 5.3 | 0.06 | 350 | 95 | 6.0 | 2.7 | 1.8 |
| | heptane | 5.3 | 0.05 | 360 | 225 | 6.2 | 3.5 | 2.3 |
| Ex. 8 | none | 5.1 | 0.01 | 450 | none | 7.5 | 20.4 | |
| | brine | 5.2 | 0.14 | 450 | 52 | 8.0 | 1.5 | |
| | heptane | 5.3 | 0.13 | 460 | 82 | 8.1 | 1.7 | |
| | Treatment Sol. 6 | 5.2 | 0.06 | 520 | 104 | 8.9 | 4.2 | 2.5 |
| | heptane | 5.3 | 0.06 | 500 | 270 | 8.6 | 4.1 | 2.5 |

Examples 9 and 10

Treatment Solution Preparation:

For Examples 9 and 10, Fluoroether Compounds 5 and 6, respectively, were combined at 2% by weight with 2-butoxy-ethanol (69% by weight) and ethanol (29% by weight) to prepare about 200 grams of treatment solution. The components were mixed together using a magnetic stirrer and a magnetic stir bar. The resulting solutions are referred to as Treatment Solutions 7 and 8, respectively.

Flow Setup and Procedure:

Examples 9 and 10 were carried out according to the method of Examples 1 to 3. The liquid used for each injection, the initial pressure, the pressure change (ΔP), the flow rate for each injection, the amount of liquid used for each injection, the flow rate of gas through the core (Q), the gas permeability (K), and the improvement factor (PT) are shown in Table 5, below.

TABLE 5

| Example | Liquid | Pressure (initial) | ΔP | Flow (mL/min) | Amount Liquid (g) | Q (mL/sec) | K (Darcy) | PI |
|---|---|---|---|---|---|---|---|---|
| Ex. 9 | none | 3.8 | 0.01 | 850 | none | 14.2 | 38.5 | |
| | brine | 3.8 | 0.08 | 740 | 53 | 12.8 | 4.3 | |
| | heptane | 3.8 | 0.06 | 750 | 73 | 12.9 | 5.5 | |
| | Treatment Sol. 7 | 3.8 | 0.04 | 780 | 96 | 13.2 | 10.3 | 1.9 |
| | heptane | 3.8 | 0.03 | 770 | 247 | 13.1 | 10.4 | 1.9 |
| Ex. 10 | None | 3.9 | 0.01 | 790 | none | 13.1 | 35.8 | |
| | Brine | 3.9 | 0.09 | 570 | 54 | 9.9 | 3.1 | |
| | heptane | 4.0 | 0.07 | 360 | 91 | 6.2 | 2.6 | |
| | Treatment Sol. 8 | 4.0 | 0.04 | 350 | 89 | 5.9 | 4.5 | 1.8 |
| | heptane | 4.0 | 0.03 | 330 | 210 | 5.6 | 4.9 | 1.9 |

Examples 11 and 12

Treatment Solutions:

Fluoroether Compounds 1 and 5, respectively, were combined at 2% by weight with 2-butoxyethanol (69% by weight) and ethanol (29% by weight) to prepare about 200 grams of treatment solution. The components were mixed together using a magnetic stirrer and a magnetic stir bar. The resulting solutions are referred to as Treatment Solutions 9 and 10, respectively.

Cores:

Core samples (3 inches (7.7 cm) by 1 inch (2.5 cm)) were cut from a sandstone block obtained from Cleveland Quarries, Vermillion, Ohio, under the trade designation "BEREA SANDSTONE". Each core had a pore volume of about 6 to 7 mL and a porosity of about 18% as measured by core dimension and gravity.

Figure 3:
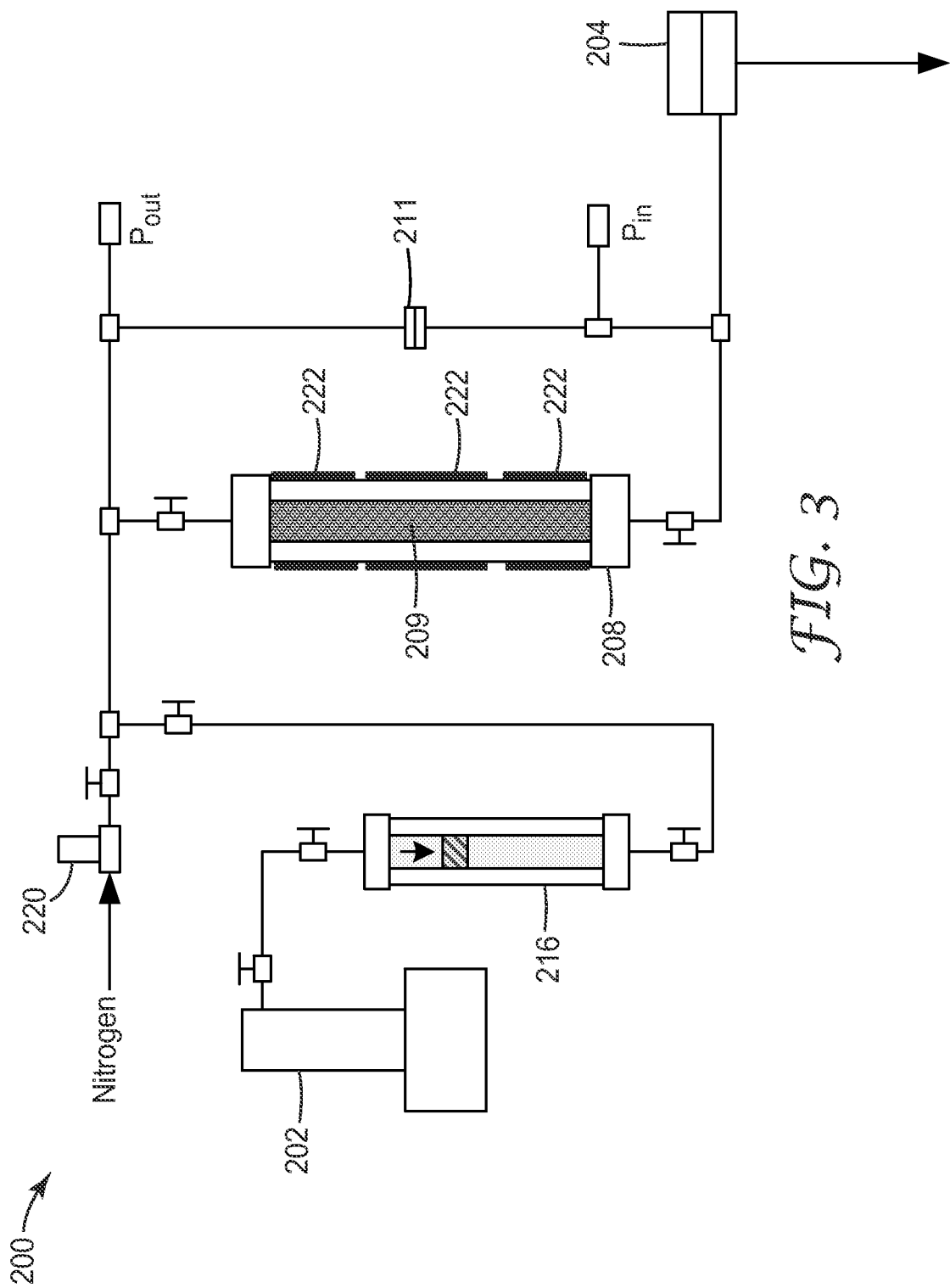
FIG. 3 is a schematic illustration of the core flood set-up used for Examples 11 and 12 and Comparative Example A.

Core Flood Setup and Procedure:

A schematic diagram of a core flood apparatus 200 that was used for Examples 11 and 12 is shown in FIG. 3. Core flood apparatus 200 includes positive displacement pump 202 (Model QX6000SS, obtained from Chandler Engineering, Tulsa, Okla.) to inject kerosene at constant rate into fluid accumulators 216. Nitrogen gas was injected at constant rate through a gas flow controller 220 (Model 5850 Mass Flow Controller, Brokks Instrument, Hatfield, Pa.). A pressure port 211 on high-pressure core holder 208 (Hassler-type Model RCHR-1.0 obtained from Temco, Inc., Tulsa, Okla.) was used to measure pressure drop across the vertical core 209. A back-pressure regulator (Model No. BP-50; obtained from Temco, Tulsa, Okla.) 204 was used to control the flowing pressure downstream of core 209. High-pressure core holder 208 was heated with 3 heating bands 222 (Watlow Thinband Model STB4A2AFR-2, St. Louis, Mo.).

For each of Examples 11 and 12, the core was dried for 72 hours in a standard laboratory oven at 95° C. and then wrapped in aluminum foil and heat shrink tubing. Referring again to FIG. 3, the wrapped core 209 was placed in core holder 208 at room temperature (about 75° F. (24° C.)). An overburden pressure of 2300 psig ($1.6 \times 10^7$ Pa) was applied. The initial single-phase gas permeability was measured using nitrogen at low system pressures between 5 to 10 psig ($3.4 \times 10^4$ to $6.9 \times 10^4$ Pa). The results are shown in Table 6, below.

Brine (3% by weight potassium chloride) was introduced into the core 209 by the following procedure to establish a saturation of 26% (i.e., 26% of the pore volume of the core was saturated with the brine). The outlet end of the core holder was connected to a vacuum pump and a full vacuum was applied for 30 minutes with the inlet closed. The inlet was connected to a burette with the water in it. The outlet was closed and the inlet was opened to allow the brine to flow into the core. The inlet and the outlet valves were then closed and the brine was allowed to distribute in the core overnight at 250° F. (121° C.).

Nitrogen and kerosene were co-injected into the core. The nitrogen flow rate for the two-phase flow was set at 500 standard cc/min, and kerosene flow rate was at 1 cc/min. The system pressure, or core pressure, was set at 900 psig ($6.2 \times 10^6$ Pa). The flow rate of nitrogen was controlled by gas flow controller 220, and the rate for kerosene was controlled by positive displacement pump 202. The liquid fractional flow rate in the core was about 10%. The gas relative permeability before treatment was calculated from the steady state pressure drop. The treatment composition was then injected into the core at a flow rate of 1.0 mL/minute for about 20 pore volumes. The treatment solution was shut in the core for overnight before the post treatment two-phase flood. The post treatment flood was done at the same conditions as that for the pre-treatment. The gas relative permeability after treatment was calculated from the steady state pressure drop.

The initial single-phase gas permeability, measured before brine saturation, the gas and oil relative permeabilities before treatment, the gas and oil relative permeabilities after treatment, the ratio of the gas relative permeabilities after and before treatment and oil relative permeabilities after and before treatment (i.e., improvement factor) are reported in Table 6, below.

TABLE 6

| Example | | Example 11 | Example 12 |
|---|---|---|---|
| Treatment Solution | | 9 | 10 |
| Absolute Permeability, mD | | 106 | 80 |
| Pre-Treatment | $K_r^g$ | 2.61% | 3.22% |
| | $K_r^o$ | 2.34% | 2.84% |
| Post-treatment | $K_r^g$ | 8.56% | 7.36% |
| | $K_r^o$ | 7.64% | 6.47% |
| Improvement Ratio | Gas | 3.28 | 2.29 |
| | Oil | 3.26 | 2.28 |

Comparative Example A

Comparative Example A was carried out according to the method of Examples 11 and 12 except the Comparative Treatment Composition was a solution of 2% by weight of a nonionic fluorinated polymeric surfactant, 2-butoxyethanol (69% by weight) and ethanol (29% by weight). The nonionic fluorinated polymeric surfactant was prepared essentially as in Examples 2A, 2B, and 4 of U.S. Pat. No. 6,664,354 (Savu et al.), incorporated herein by reference, except using 4270 kilograms (kg) of N-methylperfluorobutanesulfonamidoethanol, 1.6 kg of phenothiazine, 2.7 kg of methoxyhydroquinone, 1590 kg of heptane, 1030 kg of acrylic acid, 89 kg of methanesulfonic acid (instead of triflic acid), and 7590 kg of water in the procedure of Example 2B and using 15.6 grams of 50/50 mineral spirits/TRIGONOX-21-050 organic peroxide initiator (tert-butyl peroxy-2-ethylhexanoate obtained from Akzo Nobel, Arnhem, The Netherlands) in place of 2,2'-azobisisobutyronitrile, and with 9.9 grams of 1-methyl-2-pyrrolidinone added to the charges in the procedure of Example 4. The core flood evaluation was repeated three times and gave an average improvement ratio for gas of 1.86±0.20.

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A method comprising contacting a hydrocarbon-bearing formation with a treatment composition comprising solvent and a fluoroether-containing polymer or oligomer, wherein the fluoroether-containing polymer or oligomer comprises at least one first divalent unit represented by formula:

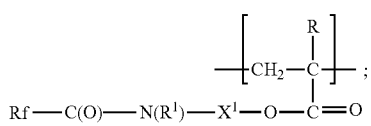

wherein
each Rf is independently selected from the group consisting of:

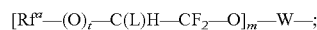

$Rf^b$—O—$(CF_2)_p$—;

$F(C_kF_{2k})$—$(O$—$C_kF_{2k})_p$—O—$CF_2$—; and $CF_3$—O—$(CF_2)_3$—$OCF(CF_3)$—$CF_2)_z$—O-$L^1$—;

each $X^1$ is independently selected from the group consisting of alkylene and arylalkylene, wherein alkylene and arylalkylene are each optionally interrupted by at least one ether linkage;

R and $R^1$ are each independently selected from the group consisting of hydrogen and alkyl having from 1 to 4 carbon atoms;

$Rf^a$ represents a partially or fully fluorinated alkyl group having from 1 to 6 carbon atoms and optionally interrupted with at least one oxygen atom;

$Rf^b$ is selected from the group consisting of $CF_3CFH$— and $F(C_jF_{2j})$—;

L is selected from the group consisting of F and $CF_3$;

L' is F or H;

W is selected from the group consisting of alkylene and arylene;

$L^1$ is selected from the group consisting of —$CF_2$—, —$CF_2CF_2$—, and —$CF(CF_3)$—;

t is 0 or 1, wherein when Rf is represented by formula $Rf^a$—$(O)_t$—CHF—$(CF_2)_n$— and t is 0, then $Rf^a$ is interrupted with at least one oxygen atom;

m is 1, 2, or 3;

n is 0 or 1;

j is an value from 1 to 4;

each k is independently 1 or 2;

each p is independently an value from 1 to 6; and z is an value from 0 to 3.

2. The method according to claim 1, wherein each Rf is independently selected from the group consisting of:

$Rf^a$—$(O)_t$—CHF—$(CF_2)_n$—; and

[$Rf^a$—$(O)_t$—C(L)H—$CF_2$—O]$_m$—W—.

3. The method according to claim 1, wherein t is 1, and wherein $Rf^a$ is selected from the group consisting of:

fully fluorinated alkyl groups having from 1 to 6 carbon atoms; and fully fluorinated groups represented by formula:
$R_f^1$—[$OR_f^2$]$_x$—, wherein
$R_f^1$ is a perfluorinated alkyl group having from 1 to 3 carbon atoms;

Each $R_f^2$ is independently perfluorinated alkylene having from 1 to 3 carbon atoms; and x is a value from 1 to 4.

4. The method according to claim 1, wherein t is 0, and wherein Rf is a fully fluorinated group represented by formula:

$R_f^4$—[$OR_f^5$]$_a$—O—$CF_2$—, wherein
$R_f^4$ is a perfluorinated alkyl group having from 1 to 3 carbon atoms;

each $R_f^5$ is independently perfluorinated alkylene having from 1 to 3 carbon atoms; and a is a value from 0 to 4.

5. The method according to claim 1, wherein Rf is:

$C_3F_7$—O—CHF—;

$CF_3$—O—$CF_2CF_2$—$CF_2$—O—CHF—;

$CF_3$—O—$CF_2$—$CF_2$—O—CHF—;

$CF_3$—O—$CF_2$—O—$CF_2$—$CF_2$—O—CHF—;

$CF_3$—O—CHF—$CF_2$—;

$CF_3$—O—$CF_2$—$CF_2$—O—CHF—$CF_2$—;

$CF_3$—$CF_2$—O—CHF—$CF_2$—;

$CF_3$—O—$CF_2$—$CF_2$—$CF_2$—O—CHF—$CF_2$—;

$CF_3$—O—$CF_2$—O—$CF_2$—$CF_2$—O—CHF—$CF_2$—;

$CF_3$—O—$CF_2$—CHF—;

$C_3F_7$—O—$CF_2$—CHF—;

$CF_3$—O—$CF_2$—$CF_2$—$CF_2$—O—$CF_2$—CHF—;

$CF_3$—O—$CF_2$—O—$CF_2$—$CF_2$—O—$CF_2$—CHF—;

$CF_3$—O—$CF_2$—CHF—$CF_2$—;

$C_2F_5$—O—$CF_2$—CHF—$CF_2$—;

$C_3F_7$—O—$CF_2$—CHF—$CF_2$—;

$CF_3$—O—$CF_2$—$CF_2$—$CF_2$—O—$CF_2$—CHF—$CF_2$—; or $CF_3$—O—$CF_2$—O—$CF_2$—$CF_2$—O—$CF_2$—CHF—$CF_2$—.

6. The method according to claim 1, wherein Rf is $CF_3$—O—$(CF_2)_3$—O—$CF_2$— or $CF_3$—$(O$—$CF_2)_p$—O—$CF_2$—, wherein p is 1, 2, or 3.

7. The method according to claim 1, wherein the fluoroether-containing polymer or oligomer further comprises at least one divalent unit represented by formula:

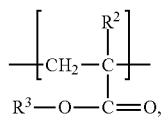

wherein
each $R^2$ is independently selected from the group consisting of hydrogen and alkyl having from 1 to 4 carbon atoms; and each $R^3$ is independently alkyl having from 1 to 30 carbon atoms.

8. The method according to claim 1, wherein the fluoroether-containing polymer or oligomer further comprises a polyalkyleneoxy segment.

9. The method according to claim 8, wherein the fluoroether-containing polymer or oligomer comprises at least one ether-containing divalent unit represented by formula:

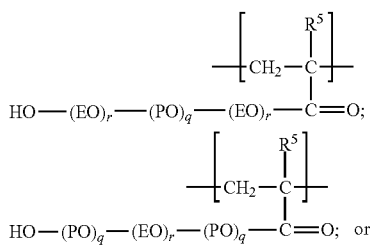

$$-\left[\text{CH}_2-\overset{R^5}{\underset{\underset{\text{C}=\text{O}}{|}}{\overset{|}{\text{C}}}}\right]-$$
$$R_4\text{O}-(\text{EO})_r-$$

wherein
R$_4$ and R$_5$ are each independently hydrogen or alkyl of 1 to 4 carbon atoms;
EO represents —CH$_2$CH$_2$O—;
each PO independently represents —CH(CH$_3$)CH$_2$O— or —CH$_2$CH(CH$_3$)O—;
each r is independently an value from 1 to 128; and
each q is independently an value from 0 to 55.

10. The method according to claim 8, wherein the polyalkyleneoxy segment is present in units represented by formula:

$$-\left[\overset{R^5}{\underset{|}{\overset{|}{\text{C}}}}-\text{CH}_2\right]-\left[\text{CH}_2-\overset{R^5}{\underset{|}{\overset{|}{\text{C}}}}\right]-$$
$$\text{O}=\text{C}-\text{O}-(\text{EO})_r-(\text{PO})_q-(\text{EO})_r-\text{C}=\text{O};$$

$$-\left[\overset{R^5}{\underset{|}{\overset{|}{\text{C}}}}-\text{CH}_2\right]-\left[\text{CH}_2-\overset{R^5}{\underset{|}{\overset{|}{\text{C}}}}\right]-$$
$$\text{O}=\text{C}-\text{O}-(\text{PO})_q-(\text{EO})_r-(\text{PO})_q-\text{C}=\text{O};$$

—S(O)$_{0-2}$—C$_s$H$_{2s}$—C(O)—O-(EO)$_r$—(PO)$_q$-(EO)$_r$—C(O)—C$_s$H$_{2s}$—S(O)$_{0-2}$—; or

—S(O)$_{0-2}$—C$_s$H$_{2s}$—C(O)—O—(PO)$_q$-(EO)$_r$—(PO)$_q$—C(O)—C$_s$H$_{2s}$—S(O)$_{0-2}$—, wherein
each R$_5$ is independently hydrogen or alkyl of 1 to 4 carbon atoms;
EO represents —CH$_2$CH$_2$O—;
each PO independently represents —CH(CH$_3$)CH$_2$O— or —CH$_2$CH(CH$_3$)O—;
each r is independently an value from 1 to 128;
each q is independently an value from 0 to 55; and
each s is independently an integer from 1 to 5.

11. The method according to claim 1, wherein the fluoroether-containing polymer or oligomer further comprises at least one anionic divalent unit represented by formula:

$$-\left[\text{CH}_2-\overset{R'}{\underset{\underset{\text{CO}_2-\text{Y}}{|}}{\overset{|}{\text{C}}}}\right]-$$

$$-\left[\text{CH}_2-\overset{R'}{\underset{\underset{\text{YO}-\overset{\|}{\underset{\text{OY}}{\text{P}}}=\text{O}}{|}}{\overset{|}{\text{C}}}}\right]-; \text{ or}$$

$$-\left[\text{CH}_2-\overset{R'}{\underset{\underset{\text{CO}-\text{Q}^1-\text{V}-\text{Z}}{|}}{\overset{|}{\text{C}}}}\right]-$$

wherein
Q$^1$ is selected from the group consisting of —O—, —S—, and —N(R$^1$)—;
R' and R$^1$ are each independently selected from the group consisting of hydrogen and alkyl having from 1 to 4 carbon atoms;
V is alkylene that is optionally interrupted by at least one ether linkage or amine linkage;
each Y is independently selected from the group consisting of hydrogen, a counter cation, and a bond to the hydrocarbon-bearing formation; and
Z is selected from the group consisting of —P(O)(OY)$_2$, —O—P(O)(OY)$_2$, —SO$_3$Y, and CO$_2$Y.

12. The method according to claim 1, wherein the fluoroether-containing polymer or oligomer further comprises at least one divalent unit represented by formula:

$$-\left[\text{CH}_2-\overset{R'}{\underset{\underset{\text{CO}-\text{Q}^1-\text{V}-\text{Z}^1}{|}}{\overset{|}{\text{C}}}}\right]-,$$

wherein
Q$^1$ is selected from the group consisting of —O—, —S—, and —N(R$^1$)—;
R' and R$^1$ are each independently selected from the group consisting of hydrogen and alkyl having from 1 to 4 carbon atoms;
V is alkylene that is optionally interrupted by at least one ether linkage or amine linkage; and
Z$^1$ is selected from the group consisting of —[N(R$^8$)$_3$]$^+$ M$^-$, —N$^+$(OY$^1$)(R$^9$)$_3$, —N$^+$(R$^8$)$_2$—(CH$_2$)$_g$—SO$_3$Y$^1$, and —N$^+$(R$^8$)$_2$—(CH$_2$)$_g$—CO$_2$Y$^1$, wherein
each R$^8$ is independently selected from the group consisting of hydrogen and alkyl having from 1 to 6 carbon atoms;
each R$^9$ is independently selected from the group consisting of hydrogen and alkyl having from 1 to 6 carbon atoms, wherein alkyl is optionally substituted by at least one halogen, alkoxy, nitro, or nitrile group, or two R$^9$ groups may join to form a 5 to 7-membered ring optionally containing at least one O, N, or S and optionally substituted by alkyl having 1 to 6 carbon atoms;
each g is independently an integer from 2 to 6;
M$^-$ is a counter anion; and
Y$^1$ is selected from the group consisting of hydrogen and a free anion.

13. The method according to claim 1, wherein the fluoroether-containing polymer or oligomer further comprises at least one divalent unit represented by formula:

$$-\left[\text{CH}_2-\overset{R^{11}}{\underset{|}{\overset{|}{\text{C}}}}\right]-$$
$$[\text{G}_{3-h}(\text{R}^{10})_h]\text{Si}-\text{V}-\text{Q}^1-\text{C}=\text{O},$$

wherein
each R$^{10}$ is independently selected from the group consisting of alkyl having from 1 to 6 carbon atoms and aryl;
Q$^1$ is selected from the group consisting of —O—, —S—, and —N(R$^1$)—;
R$^1$ and R$^{11}$ are each independently selected from the group consisting of hydrogen and alkyl having from 1 to 4 carbon atoms;

V is alkylene that is optionally interrupted by at least one ether linkage or amine linkage;

each G is independently selected from the group consisting of hydroxyl, alkoxy, acyloxy, and halogen; and h is 0, 1, or 2.

14. The method according to claim 1, wherein the hydrocarbon-bearing formation comprises at least one of limestone, dolomite, sandstone, shale, conglomerate, diatomite, or sand.

15. The method according to claim 1, wherein the hydrocarbon-bearing formation has at least one fracture, and wherein the fracture has a plurality of proppants therein.

16. The method according to claim 1, wherein the solvent comprises at least one of water, an alcohol, an ether, or a ketone, wherein the alcohol, ether, and ketone each independently have up to 4 carbon atoms.

17. The method according to claim 1 further comprising contacting the hydrocarbon-bearing formation with a fluid before contacting the hydrocarbon-bearing formation with the treatment composition, wherein the fluid at least one of at least partially solubilizes or partially displaces at least one of the brine or liquid hydrocarbons in the hydrocarbon-bearing formation.

18. A hydrocarbon-bearing formation comprising a surface, wherein at least a portion of the surface is contacted according to the method of claim 1.

19. The method according to claim 1, wherein before contacting the hydrocarbon-bearing formation with the treatment composition, the hydrocarbon-bearing formation has at least one of brine or liquid hydrocarbons, and wherein the hydrocarbon-bearing formation has at least a gas permeability that is increased after it is contacted with the treatment composition.

20. A hydrocarbon-bearing formation comprising a surface, wherein at least a portion of the surface is in contact with a fluorinated siloxane, the fluorinated siloxane comprising at least one condensation product of a fluorinated silane comprising at least one divalent unit represented by formula:

$$Rf-C(O)-N(R^1)-X^1-O-\overset{\overset{\displaystyle R}{|}}{\underset{\underset{\displaystyle C=O}{|}}{C}}-\left[CH_2-C\right], \text{ and}$$

at least one divalent unit represented by formula:

$$[G_{3-h}(R^{10})_h]Si-V-Q^1-\overset{\overset{\displaystyle R^{11}}{|}}{\underset{\underset{\displaystyle C=O}{|}}{C}}-\left[CH_2-C\right],$$

wherein each Rf is independently selected from the group consisting of:

$Rf^a-(O)_t-CHL'-(CF_2)_n-$;

$[Rf^a-(O)_t-C(L)H-CF_2-O]_m-W-$;

$Rf^b-O-(CF_2)_p-$;

$F(C_kF_{2k})-(O-C_kF_{2k})_p-O-CF_2-$; and $CF_3-O-(CF_2)_3-(OCF(CF_3)-CF_2)_z-O-L^1-$;

$Rf^a$ represents a partially or fully fluorinated alkyl group having from 1 to 6 carbon atoms and optionally interrupted with at least one oxygen atom;

$Rf^b$ is selected from the group consisting of $CF_3CFH-$ and $F(C_jF_{2j})-$;

L is selected from the group consisting of F and $CF_3$;

W is selected from the group consisting of alkylene and arylene;

L' is F or H;

$L^1$ is selected from the group consisting of $-CF_2-$, $-CF_2CF_2-$, and $-CF(CF_3)-$;

t is 0 or 1, wherein when Rf is represented by formula $Rf^a-(O)_t-CHL'-(CF_2)_n-$ and t is 0, then $Rf^a$ is interrupted with at least one oxygen atom;

m is 1, 2, or 3;

n is 0 or 1;

each j is independently an value from 1 to 4;

each k is independently 1 or 2;

each p is independently an value from 1 to 6;

z is an value from 0 to 3;

$X^1$ is independently selected from the group consisting of alkylene and arylalkylene, and wherein alkylene and arylalkylene are each optionally interrupted by at least one ether linkage;

each $R^{10}$ is independently selected from the group consisting of alkyl having from 1 to 6 carbon atoms and aryl;

$Q^1$ is selected from the group consisting of $-O-$, $-S-$, and $-N(R^1)-$;

R, $R^1$, and $R^{11}$ are each independently selected from the group consisting of hydrogen and alkyl having from 1 to 4 carbon atoms;

V is alkylene that is optionally interrupted by at least one ether linkage or amine linkage;

each G is independently selected from the group consisting of hydroxyl, alkoxy, acyloxy, and halogen; and h is 0, 1, or 2.

* * * * *